(12) United States Patent
Du

(10) Patent No.: US 12,262,844 B2
(45) Date of Patent: Apr. 1, 2025

(54) CONTROL METHOD AND DEVICE FOR COOKING EQUIPMENT, COOKING EQUIPMENT AND STORAGE MEDIUM

(71) Applicants: Guangdong Midea Kitchen Appliances Manufacturing Co., Ltd., Foshan (CN); Midea Group Co., Ltd., Foshan (CN)

(72) Inventor: Haibo Du, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

(*) Notice: Subject to any disclaimer, the term of this patent is extended or adjusted under 35 U.S.C. 154(b) by 378 days.

(21) Appl. No.: 17/750,107

(22) Filed: May 20, 2022

(65) Prior Publication Data

US 2022/0273136 A1 Sep. 1, 2022

Related U.S. Application Data

(63) Continuation of application No. PCT/CN2020/121814, filed on Oct. 19, 2020.

(30) Foreign Application Priority Data

Nov. 20, 2019 (CN) .......................... 201911142151.X
Nov. 20, 2019 (CN) .......................... 201911143383.7

(51) Int. Cl.
*A47J 36/32* (2006.01)
*A23L 5/10* (2016.01)
*G05B 19/042* (2006.01)

(52) U.S. Cl.
CPC ................. *A47J 36/32* (2013.01); *A23L 5/10* (2016.08); *G05B 19/042* (2013.01); *A23V 2002/00* (2013.01); *G05B 2219/2643* (2013.01)

(58) Field of Classification Search
CPC .......... A47J 36/32; A23L 5/10; G05B 19/042; G05B 2219/2643; A23V 2002/00
(Continued)

(56) References Cited

U.S. PATENT DOCUMENTS

2004/0195231 A1 10/2004 Bond et al.
2014/0203012 A1  7/2014 Corona et al.

FOREIGN PATENT DOCUMENTS

CN    104248331 A    12/2014
CN    105444222 A    3/2016
(Continued)

OTHER PUBLICATIONS

Translation of CN-109541985-A (Year: 2019).*
(Continued)

*Primary Examiner* — Brent T O'Hern
(74) *Attorney, Agent, or Firm* — Morgan, Lewis & Bockius LLP

(57) ABSTRACT

A control method for a cooking equipment includes: acquiring image information of a cooking material; identifying the image information, and determining category information and volume information of the cooking material; and according to the category information and the volume information, determining the doneness corresponding to the cooking material. The volume information and the category information of the cooking material are obtained by identifying the image information, the volume change amount of the cooking material in the cooking process is calculated by using the initial volume and the current volume of the cooking material. Based on the volume change amount of the cooking material, the doneness corresponding to the cooking material is determined in a pre-trained doneness model. The control method includes monitoring the volume change of the cooking material in real time, to achieve an (Continued)

automatic doneness recognition function using the volume change amount.

9 Claims, 13 Drawing Sheets

(58) Field of Classification Search
USPC .......................................................... 426/231
See application file for complete search history.

(56) References Cited

FOREIGN PATENT DOCUMENTS

| | | | |
|---|---|---|---|
| CN | 106102479 | A | 11/2016 |
| CN | 106372198 | A | 2/2017 |
| CN | 108919721 | A | 11/2018 |
| CN | 109254539 | A | 1/2019 |
| CN | 109362826 | A | 2/2019 |
| CN | 109426167 | A | 3/2019 |
| CN | 109541985 | A * | 3/2019 |
| CN | 109691898 | A | 4/2019 |
| CN | 109727657 | A | 5/2019 |
| CN | 109998360 | A | 7/2019 |
| CN | 110084372 | A | 8/2019 |
| CN | 110123149 | A | 8/2019 |
| CN | 110234040 | A | 9/2019 |
| CN | 110275456 | A | 9/2019 |
| CN | 110780628 | A | 2/2020 |
| CN | 110806699 | A | 2/2020 |
| WO | WO 2019/066216 | A1 | 4/2019 |

OTHER PUBLICATIONS

Midea Group Co., Ltd., ISRWO, PCT/CN2020/121814, Jan. 21, 2021, 9 pgs.
Midea Group Co., Ltd., CN Search Report, CN Patent Application No. 201911142151.X, May 26, 2020, 5 pgs.
Midea Group Co., Ltd., 1$^{st}$ CN Office Action, CN Patent Application No. 201911142151.X, Jun. 9, 2020, 17 pgs.
Midea Group Co., Ltd., 2$^{nd}$ CN Office Action, CN Patent Application No. 201911142151.X, Mar. 1, 2021, 17 pgs.
Midea Group Co., Ltd., CN Search Report, CN Patent Application No. 201911143383.7, Feb. 22, 2021, 5 pgs.
Midea Group Co., Ltd., CN Supplementary Search Report, CN Patent Application No. 201911143383.7, Sep. 14, 2021, 3 pgs.
Midea Group Co., Ltd., 1$^{st}$ CN Office Action, CN Patent Application No. 201911143383.7, Mar. 3, 2021, 17 pgs.
Midea Group Co., Ltd., 2$^{nd}$ nd CN Office Action, CN Patent Application No. 201911143383.7, Sep. 22, 2021, 12 pgs.
Midea Group Co., Ltd., 3$^{rd}$ CN Office Action, CN Patent Application No. 201911143383.7, Mar. 25, 2022, 14 pgs.
Midea Group Co., Ltd., European Office Action, EP Patent Application No. 20891069.5, Apr. 5, 2024, 7 pgs.
Midea Group Co., Ltd., Chinese Office Action, CN Patent Application No. 201911143383.7, Jul. 5, 2022, 18 pgs.
Midea Group Co., Ltd., Extended European Search Report and Supplementary Search Report, EP20891069.5, Nov. 18, 2022, 9 pgs.
Midea Group Co., Ltd., IPRP, PCT/CN2020/121814, May 17, 2022, 7 pgs.

* cited by examiner

CONTROL METHOD AND DEVICE FOR COOKING EQUIPMENT, COOKING EQUIPMENT AND STORAGE MEDIUM

RELATED APPLICATIONS

This application is a continuation of PCT International Application No. PCT/CN2020/121814, filed Oct. 19, 2020, entitled "Control Method and Device for Cooking Equipment, Cooking Equipment and Storage Medium," which claims priority to Chinese Patent Application No. 201911143383.7 filed with China National Intellectual Property Administration on Nov. 20, 2019, entitled "Control Method and Device for Cooking Equipment, Cooking Equipment and Storage Medium," and to Chinese Patent Application No. 201911142151.X filed with China National Intellectual Property Administration on Nov. 20, 2019, and entitled "Control Method and Device for Cooking Equipment, Cooking Equipment and Storage Medium," the entire contents of which are herein incorporated by reference.

FIELD

The present disclosure relates to the technical field of cooking equipment, and particularly to a control method and device for a cooking equipment, the cooking equipment and a computer readable storage medium.

BACKGROUND

Some surface states such as shapes, colors, smells, etc. are changed in a cooking process of food, experienced cooks can determine the doneness of the food by means of these changes, however, a novice cannot accurately determine the doneness by means of the change of these surface states. In the related art, the information change of surface textures as well as color and luster of heated food is acquired by using a hyperspectral image, and then, the change of the doneness of the food is determined. Such a method has relatively numerous defects: firstly, a little of food may be obviously changed in color and texture when being cooked; secondly, the color change of the food is greatly affected by different cooking manners, addition or no addition of seasonings, etc.; and thirdly, due to heating nonuniformity, the change of the surface temperature of the food cannot reflect the internal temperature of the food, the surface color of the food does not necessarily reflect the doneness of the food, and thus, erroneous judgement on the doneness is caused.

SUMMARY

The present disclosure is directed to solve at least one of the foregoing technical problems existing in the prior art or related art.

To this end, it is an object of a first aspect of the present disclosure to provide a control method for a cooking equipment.

It is an object of a second aspect of the present disclosure to provide a control method for a cooking equipment.

It is an object of a third aspect of the present disclosure to provide a control device for a cooking equipment.

It is an object of a fourth aspect of the present disclosure to provide a control device for a cooking equipment.

It is an object of a fifth aspect of the present disclosure to provide a cooking equipment.

It is an object of a sixth aspect of the present disclosure to provide a cooking equipment.

It is an object of a fifth aspect of the present disclosure to provide a computer readable storage medium.

To this end, according to a first aspect of the present disclosure, a control method for a cooking equipment is provided. The control method includes: acquiring image information of a cooking material; identifying the image information, and determining category information and volume information of the cooking material; and determining a doneness corresponding to the cooking material, according to the category information and the volume information.

According to the control method for the cooking equipment provided in the present disclosure, the image information of the cooking material is acquired, size information and the category information of the cooking material are obtained by identifying the image information, then, the volume information of the cooking material is obtained according to the size information, the volume change amount of the cooking material in a cooking process is calculated by using the initial volume and the current volume of the cooking material, and according to the volume change amount of the cooking material, the doneness corresponding to the cooking material is determined in a pre-trained doneness model; thus, on one hand, the volume change of the cooking material can be monitored in real time, on the other hand, an automatic doneness recognition function is achieved by using the volume change amount, the observation time of a user is greatly saved, the recognition difficulty is effectively lowered, accuracy is higher compared with that in the solution that in the prior art, the food doneness is determined purely according to surface states such as colors, etc., and a reliable basis is provided for subsequently controlling the cooking equipment to work.

Specifically, the image information includes a two-dimensional color image and a three-dimensional image. The category information of the cooking material is identified by using the two-dimensional image, the size information is identified by using the three-dimensional image, and further, an image is enhanced after being acquired, so that the resolution of the image is improved, which is beneficial to the accurate identification of the category information and the size information. An image recognition algorithm may be a local recognition algorithm, a cloud recognition algorithm, a deep learning manner or a mode recognition manner.

In addition, the control method for the cooking equipment according to the above embodiment provided in the present disclosure may further have the following additional technical features.

In the above embodiment, further, the step of determining a doneness corresponding to the cooking material, according to the category information and the volume information specifically includes: calculating the volume change amount of the cooking material according to the volume information; and according to the category information and the volume change amount, determining, by using a doneness model, the doneness corresponding to the cooking material.

In this embodiment, since the cooking material is half-cooked or fermented, the volume of the cooking material has been changed to a certain extent, if the doneness of the cooking material is only determined according to the change of a volume value, certain errors may be caused. The volume change amount is only related to the cooking process, and therefore, the initial volume of the cooking material, namely the volume information acquired for the first time after the cooking material is put into the cooking equipment, is called, the volume change amount of the cooking material is determined according to a ratio or difference of the current volume and the initial volume, the volume change amount is compared with data in the doneness model according to the category information of the cooking material, and thus, the doneness of the cooking material is obtained. According to the above embodiment, not only is it convenient for a user to monitor the volume change of the cooking material at different cooking stages, but also manual intervention is not needed in the overall process of determining the doneness, the user can rapidly and accurately know about the current doneness level of the cooking material even if he has no cooking experience, which is beneficial for the user to efficiently plan the cooking In any one of the above embodiments, further, the step of identifying the image information, and determining the volume information of the cooking material specifically includes: identifying the image information, and determining three-dimensional information of the cooking material; determining size information of the cooking material according to the three-dimensional information; and determining the volume information according to the size information.

In this embodiment, the three-dimensional image in the image information is recognized, three-dimensional information of the cooking material is determined, the size information, namely length, width and height, of the cooking material is obtained according to the three-dimensional information, the volume information of the cooking material is calculated according to the size information, then, the volume change amount is calculated according to the volume information, and thus, the doneness of the cooking material is automatically determined according to the volume change amount.

Specifically, the three-dimensional information is a three-dimensional cloud point including coordinate information and color information and/or laser reflection intensity, and then, the size of the cooking material is calculated according to the coordinate information.

In any one of the above embodiments, further, before the step of acquiring the image information of the cooking material, the control method further includes: constructing and storing the doneness model.

Further, the step of constructing and storing the doneness model specifically includes: collecting volume data and cooking parameters corresponding to different categories of cooking materials; determining volume change amount data of the different categories of cooking materials according to the volume data; recording a correspondence between each of the volume change amount data and the cooking parameters of any one of the cooking materials and a preset doneness level; and constructing and storing the doneness model according to the correspondence.

In this embodiment, the volume data and the cooking parameters corresponding to the different categories of cooking materials are collected, wherein the cooking parameters include a mode, power and duration. The volume change amount data of the different categories of cooking materials is calculated according to the volume data, under different cooking modes and power, the volume V0 of an undercooked cooking material in the different categories of cooking materials is gradually changed into V1, V2, V3, . . . Vn with the increment of cooking duration, the volume change ratio of the volume within different cooking duration to the volume of the cooking material is expressed as RV1=V1/V0, RV2=V2/V0, . . . RVn=Vn/0, the correspondence between each of the volume change amount data and the cooking parameters of any one of the cooking materials and the preset doneness level is recorded, and the doneness model is constructed according to the foregoing correspondence and is stored in a system, so that the doneness of the cooking material at different cooking stages is determined according to the category information and the volume change amount when the cooking material is cooked.

Specifically, in the model, the preset doneness level of the cooking material is divided into a plurality of doneness levels from uncooked to burned, such as seven doneness levels including uncooked, rare, medium, medium well, well done, overdone and burned, and the doneness level may need to be reasonably set by a user as a matter of experience or a certain determination standard.

In addition, in view of that the cooking material itself has certain doneness, the volume change ratio may also be calculated by adopting a ratio of the current volume to a volume measured last time, that is, RV1=V1/V0, RV2=V2/V1, . . . RVn=Vn/n−1.

In any one of the above embodiments, further, before the step of determining a doneness corresponding to the cooking material, according to the category information and the volume information, the control method further includes: acquiring a target doneness level of the cooking material; according to the category information and the target doneness level, acquiring the corresponding cooking parameters by using the doneness model; and controlling the cooking equipment to work according to the cooking parameters.

In this embodiment, the target doneness level of the cooking material, namely the doneness of the cooking material, such as medium-well steak, well-done bread, etc. desired by a user, is acquired, the cooking parameters which have been stored in the doneness model are selected according to the category information and the target doneness level, the cooking equipment is controlled to work according to the cooking parameters, and thus, automatic cooking of the cooking material is achieved, the cooking material directly reaches the target doneness level after being cooked, and overcooking or undercooking is avoided; moreover, the overall cooking process need not be watched by the user, a reliable cooking solution which is simple, accurate and easy to operate can be provided for the user having no cooking experience, various demands of the user are met, and the practicability and popularization of the cooking equipment are improved.

It should be noted that when one cooking material in the doneness model is pre-trained with various cooking parameters, all the cooking parameters are pushed to the user, and the cooking equipment is controlled to work according to the parameter determined by the user. For example, the user wants to heat fish to be well done, there is a first parameter: baking, 2000 W, 10 min and a second parameter: steaming, 1000 W, 20 min in the model, at the moment, the user may select the first or second parameter as desired.

In any one of the above embodiments, further, the control method further includes: acquiring the current working duration of the cooking equipment; determining remaining working duration according to a difference of a cooking duration threshold corresponding to the cooking parameters and the current working duration; and displaying the remaining working duration.

In this embodiment, the current working duration of the cooking equipment, namely the duration that the cooking equipment works according to the cooking parameters, is acquired, a remaining cooking duration for reaching the target doneness level from the current doneness level of the cooking material is determined according to the difference of the cooking duration threshold corresponding to the cooking parameters and the current working duration, and the remaining working duration is displayed to prompt a user to count down the cooking time, it is convenient for the user to intuitively know about the cooking time, which is beneficial to cooking planning, thereby increasing the cooking efficiency and improving the use experience of the user.

In any one of the above embodiments, further, before the step of displaying the remaining working duration, the control method further includes: according to the current doneness level and the target doneness level of the cooking material, determining, by using the doneness model, a remaining cooking duration for reaching the target doneness level from the current doneness level; comparing the remaining cooking duration with the remaining working duration; and based on a situation that the remaining cooking duration is greater or smaller than the remaining working duration, adjusting the cooking parameters.

In this embodiment, if there is a bias between the set cooking duration threshold and the actual cooking duration for the cooking material, cooking is ended, but the cooking material is burned or does not reach the target doneness level. Therefore, according to the current doneness level and the target doneness level of the cooking material, the cooking duration respectively corresponding to the current doneness level and the target doneness level is determined by means of a relation between the preset doneness level in the doneness model and the cooking parameters, then, the remaining cooking duration for reaching the target doneness level from the current doneness level is calculated, the remaining cooking duration is compared with the remaining working duration, if the remaining cooking duration is inconsistent with the remaining working duration, it is proven that the situation that the cooking material is burned or does not reach the target doneness level is easily caused in this cooking, at the moment, the cooking parameters of the cooking material are adjusted to enable the remaining cooking duration to be equal to the remaining working duration, and therefore, it is ensured that the cooking material reaches the target doneness level after the cooking equipment works according to the cooking parameters, the automatic and dynamic adjustment of the cooking process is achieved, and the user experience is improved.

In any one of the above embodiments, further, the control method further includes: based on a situation that the current doneness level of the cooking material reaches the target doneness level, controlling the cooking equipment to stop working, and sending prompt information; or according to the doneness model, determining a volume change amount range corresponding to the target doneness level; and based on a situation that the volume change amount satisfies the volume change amount range, controlling the cooking equipment to stop working, and sending prompt information.

In this embodiment, when the current doneness level of the cooking material reaches the target doneness level, or the volume change amount satisfies the volume change amount range corresponding to the target doneness level, it is proven that the cooking material is completely cooked, at the moment, the cooking equipment is controlled to stop working, and the prompt information is sent to prompt the user to end the cooking. By adopting the foregoing solution, the doneness level of the cooking material is affirmed without adopting the original manual manner, and the cooking material is automatically cooked according to the set cooking parameters, so that the observation time of the user is saved, great convenience is brought for the user, and the use experience of the user is greatly enhanced.

Specifically, the prompt manner includes at least one described as follows: voice, lamplight and images.

According to a second aspect of the present disclosure, a control method for a cooking equipment is provided. The control method includes: acquiring image information of a cooking material and weight information of the cooking material; and according to the image information and the weight information, determining the doneness corresponding to the cooking material.

According to the control method for the cooking equipment provided in the present disclosure, the volume of the cooking material may be increased or reduced in a cooking process, and the weight may also be changed due to the evaporation of water, so that the doneness change of the cooking material from inside to outside may be integrated to density information. Size information and category information of the cooking material are obtained by identifying the image information, then, volume information of the cooking material is obtained according to the size information, density information of the cooking material is calculated according to the volume information and the weight information of the cooking material, and according to the density of the cooking material, the doneness corresponding to the cooking material is determined in a pre-trained doneness model; thus, on one hand, the volume and weight change, namely the density change, of the cooking material can be monitored in real time, on the other hand, an automatic doneness recognition function is achieved by using the density, the observation time of a user is greatly saved, the recognition difficulty is effectively lowered, inaccuracy caused by purely determining the doneness of a food by means of a color and a surface temperature in a conventional method is avoided, and a reliable basis is provided for subsequently controlling the cooking equipment to work.

In addition, the control method for the cooking equipment according to the above embodiment provided in the present disclosure may further have the following additional technical features.

In the above embodiment, further, the step of according to the image information and the weight information, determining the doneness corresponding to the cooking material specifically includes: identifying the image information, and determining category information and volume information of the cooking material; calculating density information of the cooking material according to the volume information and the weight information; and according to the category information and the density information, determining, by using a doneness model, the doneness corresponding to the cooking material.

In this embodiment, since the cooking material is half-cooked or fermented, the volume of the cooking material has been changed to a certain extent, if the doneness of the cooking material is only determined according to the volume change, certain errors may be caused. The density of the cooking material is a cumulant and may comprehensively reflect the actual doneness of the cooking material, and therefore, the category information and the volume information of the cooking material are determined by using the image information, the density information of the corresponding cooking material is obtained according to a formula: density $(\rho)$=weight $(m)$/volume $(V)$, the density of the cooking material is compared with data in the doneness model according to the category information of the cooking material, and thus, the doneness of the cooking material is obtained. Therefore, recognition achieved by manual observation is not needed, a doneness determination function is provided for a user having no cooking experience, the accuracy for doneness recognition is effectively improved, and a reliable basis is provided for subsequently controlling the cooking equipment to work.

Specifically, the image information includes a two-dimensional color image and a three-dimensional image. The category information of the cooking material is identified by using the two-dimensional image, the size information is identified by using the three-dimensional image, and further, an image is enhanced after being acquired, so that the resolution of the image is improved, which is beneficial to the accurate identification of the category information and the size information.

In any one of the above embodiments, further, the step of identifying the image information, and determining the volume information of the cooking material specifically includes: identifying the image information, and determining three-dimensional information of the cooking material; determining size information of the cooking material according to the three-dimensional information; and determining the volume information according to the size information.

In this embodiment, the three-dimensional image in the image information is recognized, three-dimensional information of the cooking material is determined, the size information, namely length, width and height, of the cooking material is obtained according to the three-dimensional information, the volume information of the cooking material is calculated according to the size information, then, the density is calculated by using the volume and the weight, and thus, the doneness of the cooking material is automatically determined according to the density.

Specifically, the three-dimensional information is a three-dimensional cloud point including coordinate information and color information and/or laser reflection intensity, and then, the size of the cooking material is calculated according to the coordinate information.

In any one of the above embodiments, further, before the step of acquiring the image information of the cooking material and the weight information of the cooking material, the control method further includes: constructing and storing the doneness model.

Further, the step of constructing and storing the doneness model specifically includes: collecting volume data, weight data and cooking parameters corresponding to different categories of cooking materials; calculating density data of the different categories of cooking materials according to the volume data and the weight data; recording a correspondence between the volume data, the weight data, the density data and the cooking parameters of any one of the cooking materials and a preset doneness level; and constructing and storing the doneness model according to the correspondence.

In this embodiment, the volume data, the weight data and the cooking parameters corresponding to the different categories of cooking materials are collected, wherein the cooking parameters include a mode, power and duration. The density data of the different categories of cooking materials is calculated according to the volume data and the weight data; under different cooking modes and power, the volume and weight of an undercooked cooking material in the different categories of cooking materials are gradually changed with the increment of cooking duration, the density $\rho 0$ of the undercooked cooking material is also gradually changed to $\rho 1, \rho 2, \rho 3, \ldots \rho n$ while the cooking material is cooked; the correspondence between the volume data, the weight data, the density data and the cooking parameters of any one of the cooking materials and the preset doneness level is recorded; and the doneness model is constructed according to the foregoing correspondence and is stored in a system, so that the doneness of the cooking material at different cooking stages is determined according to the category information and the density information when the cooking material is cooked.

Specifically, in the model, the preset doneness level of the cooking material is divided into a plurality of doneness levels from uncooked to burned, such as seven doneness levels including uncooked, rare, medium, medium well, well done, overdone and burned, and the doneness level may need to be reasonably set by a user as a matter of experience or a certain determination standard.

In any one of the above embodiments, further, before the step of according to the category information and the density information, determining, by using the doneness model, the doneness corresponding to the cooking material, the control method further includes: acquiring a target doneness level of the cooking material; according to the category information and the target doneness level, acquiring the corresponding cooking parameters by using the doneness model; and controlling the cooking equipment to work according to the cooking parameters.

In this embodiment, the target doneness level of the cooking material, namely the doneness of the cooking material, such as medium-well steak, well-done bread, etc. desired by a user, is acquired, the cooking parameters which have been stored in the doneness model are selected according to the category information and the target doneness level, the cooking equipment is controlled to work according to the cooking parameters, and thus, automatic cooking of the cooking material is achieved, the cooking material directly reaches the target doneness level after being cooked, and overcooking or undercooking is avoided; moreover, the overall cooking process does not need to be watched by the user, and a reliable cooking solution which is simple, accurate and easy to operate can be provided for the user having no cooking experience.

It should be noted that when one cooking material in the doneness model is pre-trained with various cooking parameters, all the cooking parameters are pushed to the user, and the cooking equipment is controlled to work according to the parameter determined by the user. For example, the user wants to heat fish to be well done, there is a first parameter: baking, 2000 W, 10 min and a second parameter: steaming, 1000 W, 20 min in the model, at the moment, the user may select the first or second parameter as desired.

In any one of the above embodiments, further, the control method further includes: acquiring the current working duration of the cooking equipment; determining remaining working duration according to a difference of a cooking duration threshold corresponding to the cooking parameters and the current working duration; and displaying the remaining working duration.

In this embodiment, the current working duration of the cooking equipment, namely the duration that the cooking equipment works according to the cooking parameters, is acquired, a remaining cooking duration for reaching the target doneness level from the current doneness level of the cooking material is determined according to the difference of the cooking duration threshold corresponding to the cooking parameters and the current working duration, and the remaining working duration is displayed to prompt a user to count down the cooking time, it is convenient for the user to intuitively know about the cooking time, which is beneficial to cooking planning, thereby increasing the cooking efficiency and improving the use experience of the user.

In any one of the above embodiments, further, before the step of displaying the remaining working duration, the control method further includes: according to the current doneness level and the target doneness level of the cooking material, determining, by using the doneness model, a remaining cooking duration for reaching the target doneness level from the current doneness level; comparing the remaining cooking duration with the remaining working duration; and based on a situation that the remaining cooking duration is greater or smaller than the remaining working duration, adjusting the cooking parameters.

In this embodiment, due to certain doneness of the cooking material itself or other factors, there is a bias between the set cooking duration threshold and the actual cooking duration for the cooking material, by which cooking is ended, but the cooking material is burned or does not reach the target doneness level. Therefore, according to the current doneness level and the target doneness level of the cooking material, the cooking duration respectively corresponding to the current doneness level and the target doneness level is determined by means of a relation between the preset doneness level in the doneness model and the cooking parameters, then, the remaining cooking duration for reaching the target doneness level from the current doneness level is calculated, the remaining cooking duration is compared with the remaining working duration, if the remaining cooking duration is inconsistent with the remaining working duration, it is proven that the situation that the cooking material is burned or does not reach the target doneness level is easily caused in this cooking, at the moment, the cooking parameters of the cooking material are adjusted to enable the remaining cooking duration to be equal to the remaining working duration, and therefore, it is ensured that the cooking material reaches the target doneness level after the cooking equipment works according to the cooking parameters, the automatic and dynamic adjustment of the cooking process is achieved, and the user experience is improved.

In any one of the above embodiments, further, the control method further includes: based on a situation that the current doneness level of the cooking material reaches the target doneness level, controlling the cooking equipment to stop working, and sending prompt information; or according to the doneness model, determining a density range corresponding to the target doneness level; and based on a situation that the density information satisfies the density range, controlling the cooking equipment to stop working, and sending prompt information.

In this embodiment, when the current doneness level of the cooking material reaches the target doneness level, or the density information satisfies the density range corresponding to the target doneness level, it is proven that the cooking material is completely cooked, at the moment, the cooking equipment is controlled to stop working, and the prompt information is sent to prompt the user to end the cooking. By adopting the foregoing solution, the doneness level of the cooking material is affirmed without adopting the original manual manner, and the cooking material is automatically cooked according to the set cooking parameters, so that the observation time of the user is saved, great convenience is brought for the user, and the use experience of the user is greatly enhanced.

Specifically, the prompt manner includes at least one described as follows: voice, lamplight and images.

According to a third aspect of the present disclosure, a control device for a cooking equipment is provided. The control device includes: a memory, a processor and a computer program stored in the memory and capable of running on the processor, wherein when the computer program is executed by the processor, the control method for the cooking equipment according to the first aspect is implemented. Therefore, the control device for the cooking equipment has all the beneficial effects of any one of the foregoing control method for the cooking equipment.

According to a fourth aspect of the present disclosure, a control device for a cooking equipment is provided. The control device includes: a memory, a processor and a computer program stored in the memory and capable of running on the processor, wherein when the computer program is executed by the processor, the control method for the cooking equipment according to the fourth aspect is implemented. Therefore, the control device for the cooking equipment has all the beneficial effects of any one of the foregoing control method for the cooking equipment.

According to a fifth aspect of the present disclosure, a cooking equipment is provided. The cooking equipment includes an image acquisition device used for acquiring image information of a cooking material; and the control device for the cooking equipment according to the third aspect, wherein the control device is connected with the image acquisition device and a weight sensor.

According to the cooking equipment provided in the present disclosure, the image information of the cooking material is acquired by the image acquisition device, size information and category information of the cooking material are obtained by identifying the image information, then, volume information of the cooking material is obtained according to the size information, the volume change amount of the cooking material in a cooking process is calculated by using the initial volume and the current volume of the cooking material, and according to the volume change amount of the cooking material, the doneness corresponding to the cooking material is determined in a pre-trained doneness model; thus, on one hand, the volume change of the cooking material can be monitored in real time, on the other hand, an automatic doneness recognition function is achieved by using the volume change amount, the observation time of a user is greatly saved, the recognition difficulty is effectively lowered, accuracy is higher compared with that in the solution that in the prior art, the food doneness is determined purely according to surface states such as colors, etc., and a reliable basis is provided for subsequently controlling the cooking equipment to work.

Further, the image information includes a two-dimensional color image and a three-dimensional image. The category information of the cooking material is identified by using the two-dimensional image, and the size information is identified by using the three-dimensional image. The image acquisition device includes one or more sets of cameras. By disposing a plurality of cameras, a multi-angle image of the cooking material can be achieved, which is beneficial to identification of the size information and the category information of the cooking material.

Specifically, the cooking equipment includes, but is not limited to at least one described as follows: a baking oven, a steaming oven, a microwave oven, etc.

According to a sixth aspect of the present disclosure, a cooking equipment is provided. The cooking equipment includes an image acquisition device used for acquiring image information of a cooking material; a weight sensor used for acquiring weight information of the cooking material; and the control device for the cooking equipment according to the fourth aspect, wherein the control device is connected with the image acquisition device and the weight sensor.

According to the cooking equipment provided in the present disclosure, the image information of the cooking material is acquired by the image acquisition device, the weight information of the cooking material is acquired by the weight sensor, size information and category information of the cooking material in the image information are identified, then, the volume of the cooking material is obtained according to the size information, density information of the cooking material is calculated according to the volume information and the weight information of the cooking material, and according to the density of the cooking material, the doneness corresponding to the cooking material is determined in a pre-trained doneness model; thus, on one hand, the volume and weight change, namely the density change, of the cooking material can be monitored in real time, on the other hand, an automatic doneness recognition function is achieved by using the density, the observation time of a user is greatly saved, the recognition difficulty is effectively lowered, inaccuracy caused by purely determining the doneness of a food by means of a color and a surface temperature in a conventional method is avoided, and a reliable basis is provided for subsequently controlling the cooking equipment to work.

According to a seventh aspect of the present disclosure, provided is a computer readable storage medium storing a computer program thereon, wherein when the computer program is executed by a processor, the steps of the control method for the cooking equipment according to the first aspect or the steps of the control method for the cooking equipment according to the second aspect are implemented. Therefore, the computer readable storage medium has all the beneficial effects of the control method for the cooking equipment according to the first aspect or the control method for the cooking equipment according to the second aspect.

Additional aspects and advantages of the present disclosure will be apparent from the description which follows, or may be learned by practice of the present disclosure.

BRIEF DESCRIPTION OF THE DRAWINGS

The foregoing and/or additional aspects and advantages of the present disclosure will be apparent from and elucidated in combination with the embodiments described hereinafter with reference to the accompanying drawings, in which.

DETAILED DESCRIPTION OF THE DISCLOSURE

In order to understand the foregoing objects, features and advantages of the present disclosure more clearly, the present disclosure will be described in further detail with reference to the accompanying drawings and specific implementations. It should be noted that the embodiments and features in the embodiments of the present disclosure may be combined with one another without conflicts.

In the following description, numerous specific details are set forth in order to provide a thorough understanding of the present disclosure, but the present disclosure may be practiced otherwise than as described herein, and therefore, the protection scope of the present disclosure is not limited to the specific embodiments disclosed below.

A control method and device for a cooking equipment, the cooking equipment and a computer readable storage medium according to some embodiments of the present disclosure will now be described with reference to FIGS. 1 to 17.

Embodiment 1

Figure 1:
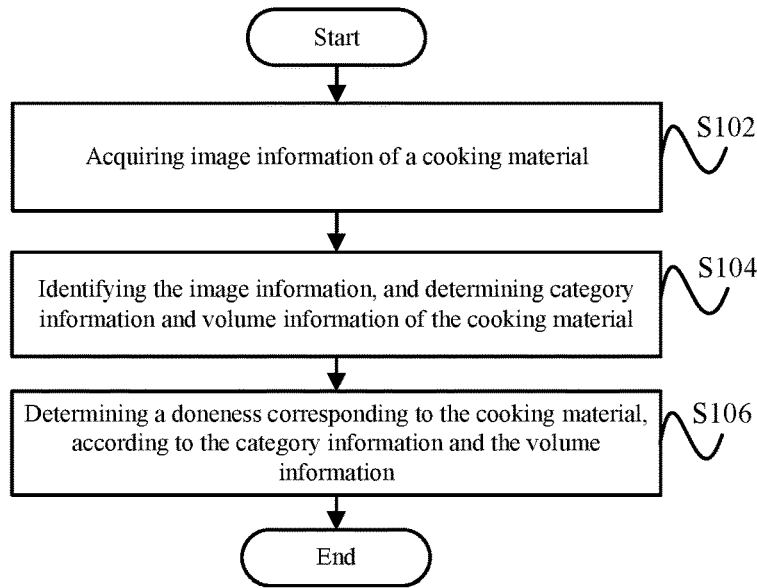
FIG. 1 shows a schematic process diagram of a control method for a cooking equipment according to an embodiment of the present disclosure.

As shown in FIG. 1, according to an embodiment in the first aspect of the present disclosure, a control method for a cooking equipment is provided. The method includes:

step S102, image information of a cooking material is acquired;

step S104, the image information is identified, and category information and volume information of the cooking material are determined; and step S106, according to the category information and the volume information, the doneness corresponding to the cooking material is determined.

In this embodiment, the image information of the cooking material is acquired, size information and the category information of the cooking material are obtained by identifying the image information, then, the volume information of the cooking material is obtained according to the size information, the volume change amount of the cooking material in a cooking process is calculated by using the initial volume and the current volume of the cooking material, and according to the volume change amount of the cooking material, the doneness corresponding to the cooking material is determined in a pre-trained doneness model; thus, on one hand, the volume change of the cooking material can be monitored in real time, on the other hand, an automatic doneness recognition function is achieved by using the volume change amount, the observation time of a user is greatly saved, the recognition difficulty is effectively lowered, accuracy is higher compared with that in the solution that in the prior art, the food doneness is determined purely according to surface states such as colors, etc., and a reliable basis is provided for subsequently controlling the cooking equipment to work.

Specifically, the image information includes a two-dimensional color image and a three-dimensional image. The category information of the cooking material is identified by using the two-dimensional image, the size information is identified by using the three-dimensional image, and further, an image is enhanced after being acquired, so that the resolution of the image is improved, which is beneficial to the accurate identification of the category information and the size information. An image recognition algorithm may be a local recognition algorithm, a cloud recognition algorithm, a deep learning manner or a mode recognition manner.

Embodiment 2

Figure 2:
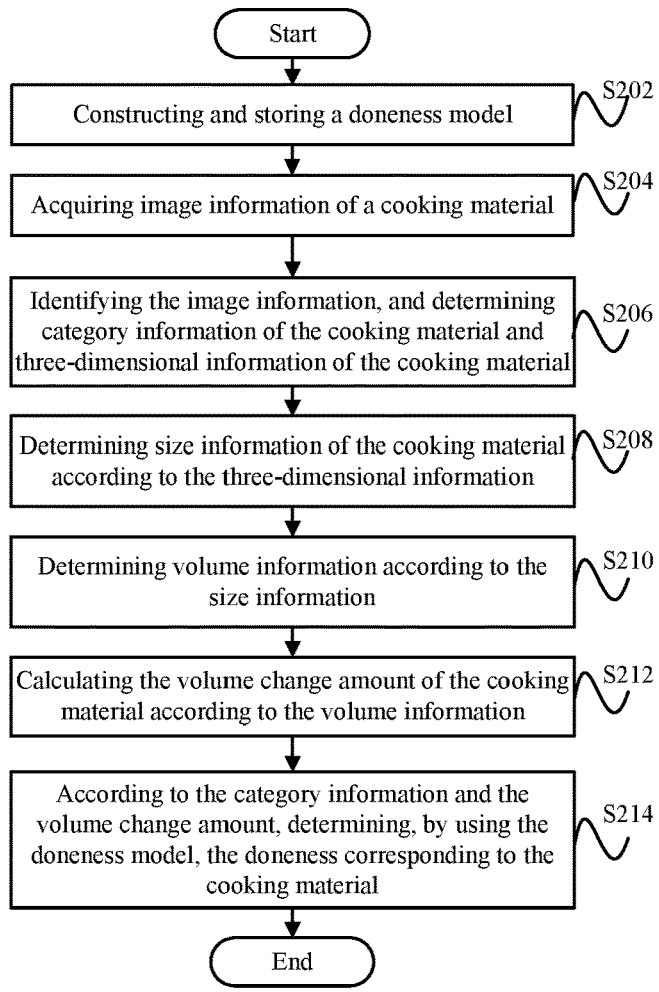
FIG. 2 shows a schematic process diagram of a control method for a cooking equipment according to another embodiment of the present disclosure.

As shown in FIG. 2, according to an embodiment of the present disclosure, a control method for a cooking equipment is provided. The method includes:
step S202, a doneness model is constructed and stored;
step S204, image information of a cooking material is acquired;
step S206, the image information is identified, and category information of the cooking material and three-dimensional information of the cooking material are determined;
step S208, size information of the cooking material is determined according to the three-dimensional information;
step S210, volume information is determined according to the size information;
step S212, the volume change amount of the cooking material is calculated according to the volume information; and
step S214, according to the category information and the volume change amount, the doneness corresponding to the cooking material is determined by using the doneness model.

In this embodiment, since the cooking material is half-cooked or fermented, the volume of the cooking material has been changed to a certain extent, if the doneness of the cooking material is only determined according to a volume, certain errors may be caused. The volume change amount is only related to the cooking process, and therefore, the initial volume of the cooking material, namely the volume information acquired for the first time after the cooking material is put into the cooking equipment, is called, the volume change amount of the cooking material is determined according to a ratio or difference of the current volume and the initial volume, the volume change amount is compared with data in the doneness model according to the category information of the cooking material, and thus, the doneness of the cooking material is obtained. According to the foregoing embodiment, not only is it convenient for a user to monitor the volume change of the cooking material at different cooking stages, but also manual intervention is not needed in the overall process of determining the doneness, the user can rapidly and accurately know about the current doneness level of the cooking material even if he has no cooking experience, which is beneficial for the user to efficiently plan the cooking.

Specifically, the three-dimensional information is a three-dimensional cloud point including coordinate information and color information and/or laser reflection intensity, and then, the size of the cooking material is calculated according to the coordinate information.

Embodiment 3

Figure 3:
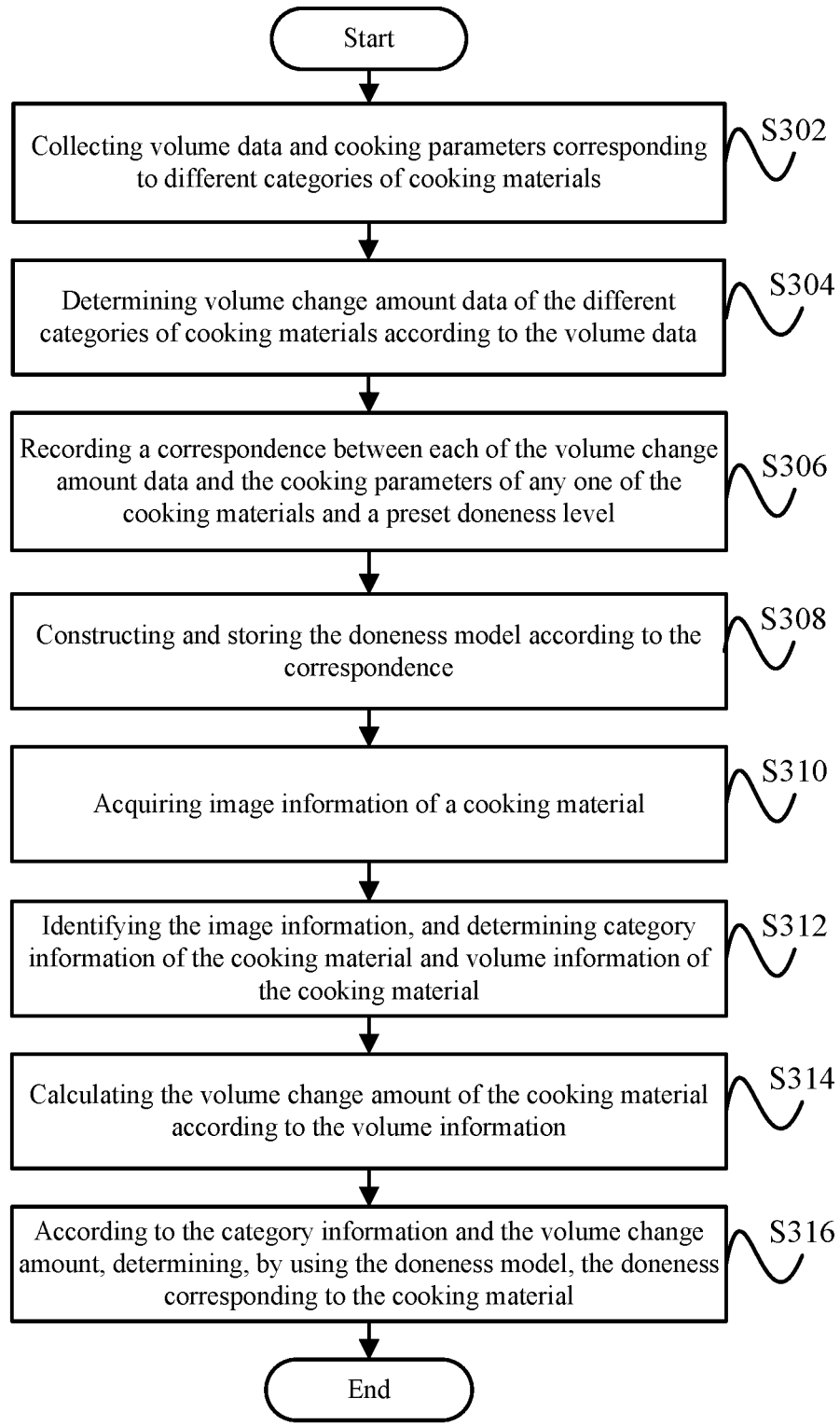
FIG. 3 shows a schematic process diagram of a control method for a cooking equipment according to another embodiment of the present disclosure.

As shown in FIG. 3, according to an embodiment of the present disclosure, a control method for a cooking equipment is provided. The method includes:
step S302, volume data and cooking parameters corresponding to different categories of cooking materials are collected;
step S304, volume change amount data of the different categories of cooking materials is determined according to the volume data;
step S306, a correspondence between each of the volume change amount data and the cooking parameters of any one of the cooking materials and a preset doneness level is recorded;
step S308, the doneness model is constructed and stored according to the correspondence;
step S310, image information of a cooking material is acquired;
step S312, the image information is identified, and category information of the cooking material and volume information of the cooking material are determined;
step S314, the volume change amount of the cooking material is calculated according to the volume information; and
step S316, according to the category information and the volume change amount, the doneness corresponding to the cooking material is determined by using the doneness model.

In this embodiment, the volume data and the cooking parameters corresponding to the different categories of cooking materials are collected, wherein the cooking parameters include a mode, power and duration. The volume change amount data of the different categories of cooking materials is calculated according to the volume data; under different cooking modes and power, the volume $V0$ of an undercooked cooking material in the different categories of cooking materials is gradually changed into $V1$, $V2$, $V3$, ... $Vn$ with the increment of cooking duration; the volume change ratio of the volume within different cooking duration to the volume of the cooking material is expressed as $RV1=V1/V0$, $RV2=V2/V0$, ... $RVn=Vn/0$; the correspondence between each of the volume change amount data and the cooking parameters of any one of the cooking materials and the preset doneness level is recorded, for example, bread which is cooked under the power of 1000 W for 20 min in a baking mode has the volume change ratio being 1.1 to 1.2 and the doneness level being rare, bread which is cooked for 60 min has the volume change ratio being 1.6 to 1.7 and the doneness level being overdone, and a steak which is cooked under the power of 1500 W for 20 min in a baking mode has the volume change ratio being 0.8 to 0.9 and the doneness level being medium well; and the doneness model is constructed according to the foregoing correspondence and is stored in a system, so that the doneness of the cooking material at different cooking stages is determined according to the category information and the volume change amount when the cooking material is cooked.

Specifically, in the model, the preset doneness level of the cooking material is divided into a plurality of doneness levels from uncooked to burned, such as seven doneness levels including uncooked, rare, medium, medium well, well done, overdone and burned, and the doneness level may need to be reasonably set by a user as a matter of experience or a certain determination standard.

Further, in view of that the cooking material itself has certain doneness, the volume change ratio may also be calculated by adopting a ratio of the current volume to a volume measured last time, that is, $RV1=V1/V0$, $RV2=V2/V1$, ... $RVn=Vn/n-1$.

Embodiment 4

Figure 4:
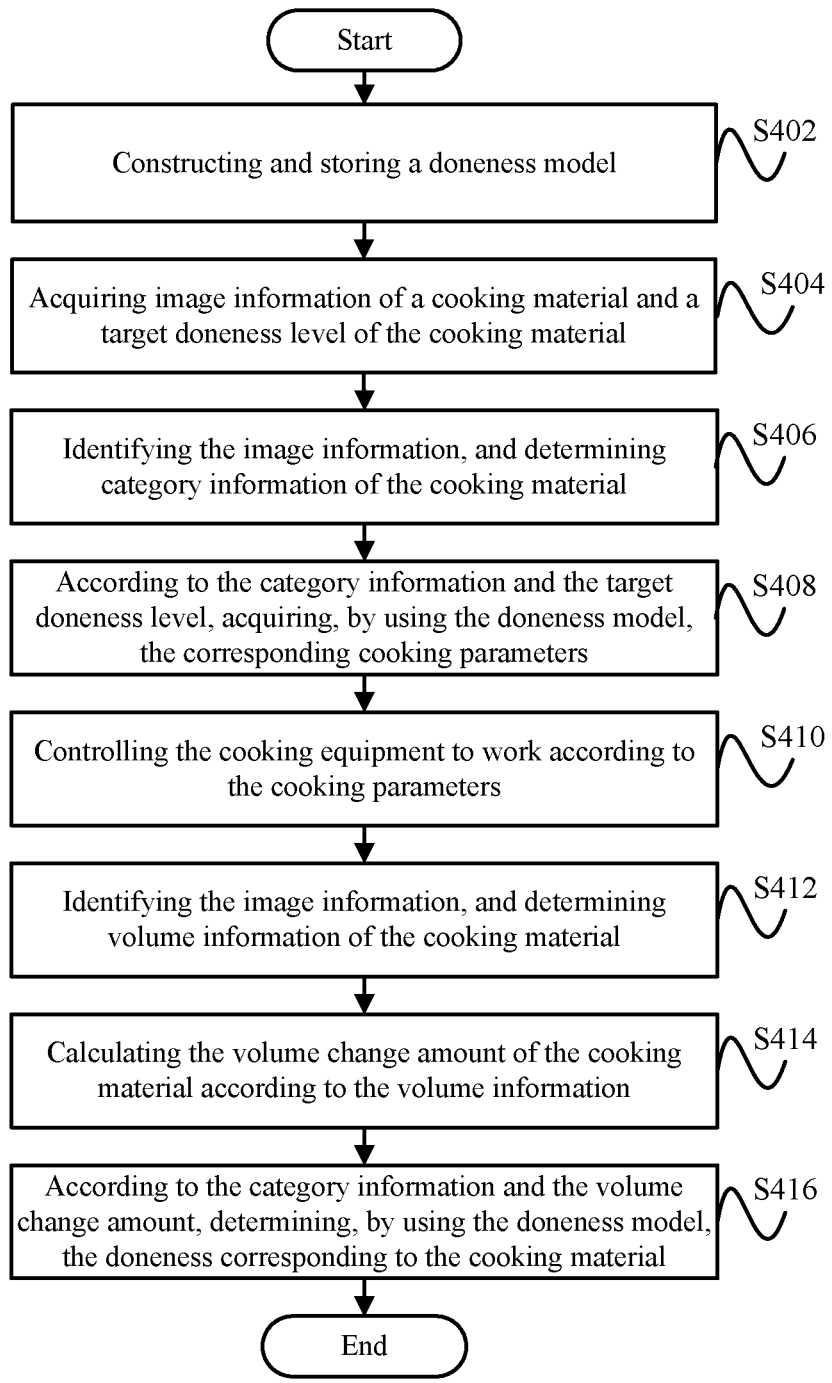
FIG. 4 shows a schematic process diagram of a control method for a cooking equipment according to another embodiment of the present disclosure.

As shown in FIG. 4, according to an embodiment of the present disclosure, a control method for a cooking equipment is provided. The method includes:

step S402, a doneness model is constructed and stored;

step S404, image information of a cooking material and a target doneness level of the cooking material are acquired;

step S406, the image information is identified, and category information of the cooking material is determined;

step S408, according to the category information and the target doneness level, the corresponding cooking parameters are acquired by using the doneness model;

step S410, the cooking equipment is controlled to work according to the cooking parameters;

step S412, the image information is identified, and volume information of the cooking material is determined;

step S414, the volume change amount of the cooking material is calculated according to the volume information; and step S416, according to the category information and the volume change amount, the doneness corresponding to the cooking material is determined by using the doneness model.

In this embodiment, the target doneness level of the cooking material, namely the doneness of the cooking material, such as medium-well steak, well-done bread, etc. desired by a user, is acquired, the cooking parameters which have been stored in the doneness model are selected according to the category information and the target doneness level, the cooking equipment is controlled to work according to the cooking parameters, and thus, automatic cooking of the cooking material is achieved, the cooking material directly reaches the target doneness level after being cooked, and overcooking or undercooking is avoided; moreover, the overall cooking process does not need to be watched by the user, a reliable cooking solution which is simple, accurate and easy to operate can be provided for the user having no cooking experience, various demands of the user are met, and the practicability and popularization of the cooking equipment are improved.

It should be noted that when one cooking material in the doneness model is pre-trained with various cooking parameters, all the cooking parameters are pushed to the user, and the cooking equipment is controlled to work according to the parameter determined by the user. For example, the user wants to heat fish to be well done, there is a first parameter: baking, 2000 W, 10 min and a second parameter: steaming, 1000 W, 20 min in the model, at the moment, the user may select the first or second parameter as desired.

In addition, at the only moment after the image information of the cooking material is acquired for the first time, according to the category information and the target doneness level, the corresponding cooking parameters are acquired by using the doneness model, and the cooking equipment is controlled to work. If the cooking equipment is in a working state, the step that the cooking parameters are acquired is automatically skipped, the image information of the cooking material is acquired in real time, and the volume information of the cooking material is monitored according to the image information until the cooling is ended.

Embodiment 5

Figure 5:
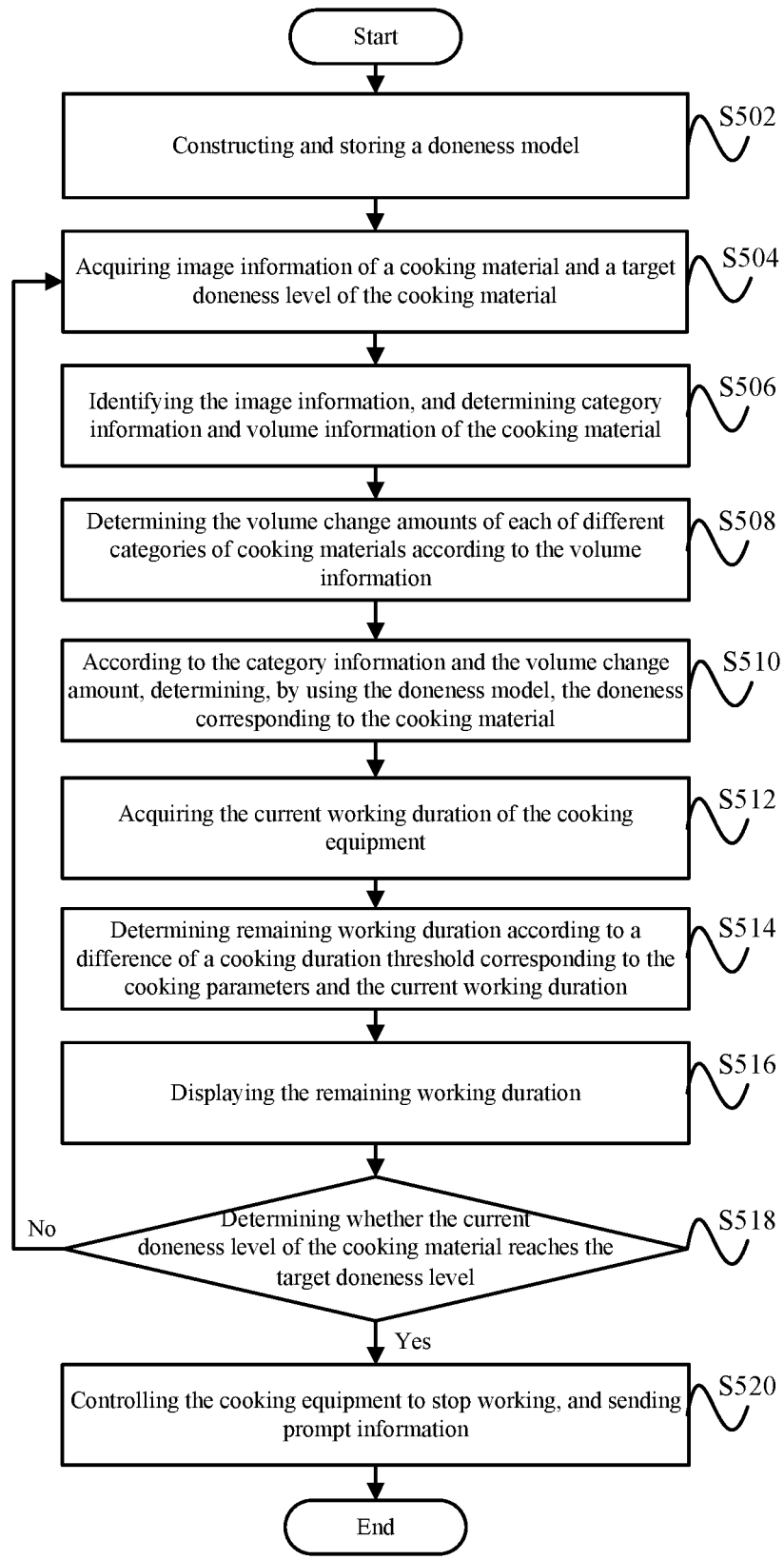
FIG. 5 shows a schematic process diagram of a control method for a cooking equipment according to another embodiment of the present disclosure.

As shown in FIG. 5, according to an embodiment of the present disclosure, a control method for a cooking equipment is provided. The method includes:

step S502, a doneness model is constructed and stored;

step S504, image information of a cooking material and a target doneness level of the cooking material are acquired;

step S506, the image information is identified, and category information and volume information of the cooking material are determined;

step S508, the volume change amounts of each of different categories of cooking materials are determined according to the volume information;

step S510, according to the category information and the volume change amount, the doneness corresponding to the cooking material is determined by using the doneness model;

step S512, the current working duration of the cooking equipment is acquired;

step S514, remaining working duration is determined according to a difference of a cooking duration threshold corresponding to the cooking parameters and the current working duration;

step S516, the remaining working duration is displayed;

step S518, it is determined whether the current doneness level of the cooking material reaches the target doneness level, if yes, step S520 is performed, if not, the step S504 is performed; and step S520, the cooking equipment is controlled to stop working, and prompt information is sent.

In this embodiment, the current working duration of the cooking equipment, namely the duration that the cooking equipment works according to the cooking parameters, is acquired, the remaining cooking duration for reaching the target doneness level from the current doneness level of the cooking material is determined according to the difference of the cooking duration threshold corresponding to the cooking parameters and the current working duration, and the remaining working duration is displayed to prompt a user to count down the cooking time, it is convenient for the user to intuitively know about the cooking time, which is beneficial to cooking planning, thereby increasing the cooking efficiency. Moreover, when the current doneness level reaches the target doneness level, it is proven that the cooking material is completely cooked, at the moment, the cooking equipment is controlled to stop working, and the prompt information is sent to prompt the user to end the cooking, so that an automatic control function of the cooking equipment is achieved. By adopting the foregoing solution, the doneness level of the cooking material is affirmed without adopting the original manual manner, and the cooking material is automatically cooked according to the set cooking parameters, so that the observation time of the user is saved, great convenience is brought for the user, and the use experience of the user is greatly enhanced.

Embodiment 6

Figure 6:
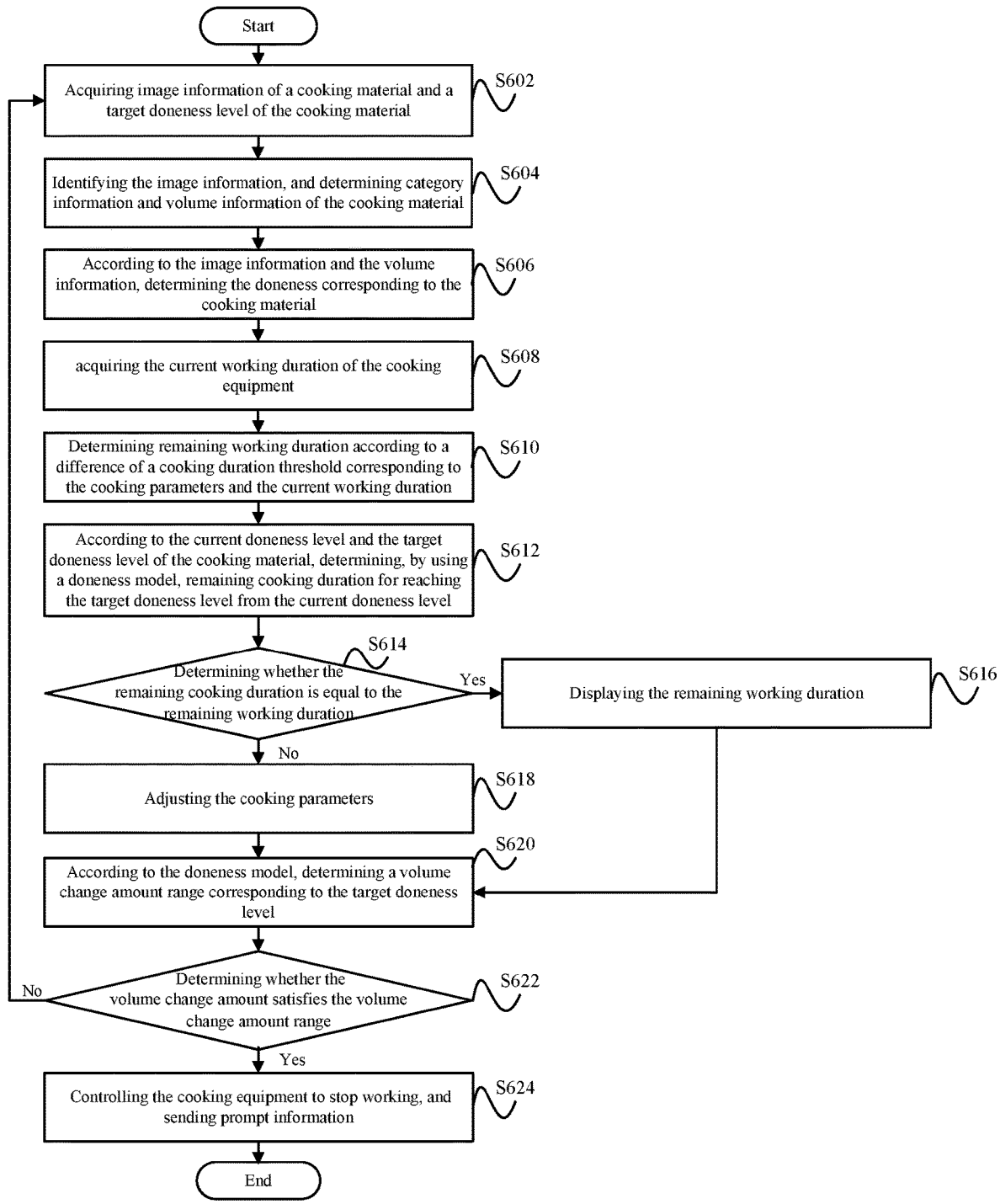
FIG. 6 shows a schematic process diagram of a control method for a cooking equipment according to another embodiment of the present disclosure.

As shown in FIG. 6, according to an embodiment of the present disclosure, a control method for a cooking equipment is provided. The method includes:

step S602, image information of a cooking material and a target doneness level of the cooking material are acquired;

step S604, the image information is identified, and category information and volume information of the cooking material are determined;

step S606, according to the image information and the volume information, the doneness corresponding to the cooking material is determined;

step S608, the current working duration of the cooking equipment is acquired;

step S610, remaining working duration is determined according to a difference of a cooking duration threshold corresponding to the cooking parameters and the current working duration;

step S612, according to the current doneness level and the target doneness level of the cooking material, remaining cooking duration for reaching the target doneness level from the current doneness level is determined by using a doneness model;

step S614, it is determined whether the remaining cooking duration is equal to the remaining working duration, if yes, step S616 is performed, if not, step S618 is performed;

step S616, the remaining working duration is displayed, and step S620 is performed;

step S618, the cooking parameters are adjusted;

step S620, according to the doneness model, a volume change amount range corresponding to the target doneness level is determined;

step S622, it is determined whether the volume change amount satisfies the volume change amount range, if yes, step S624 is performed, if not, the step S602 is performed; and step S624, the cooking equipment is controlled to stop working, and prompt information is sent.

In this embodiment, if there is a bias between the set cooking duration threshold and the actual cooking duration for cooking the cooking material, cooking is ended, but the cooking material is burned or does not reach the target doneness level. Therefore, according to the current doneness level and the target doneness level of the cooking material, the cooking duration respectively corresponding to the current doneness level and the target doneness level is determined by means of a relation between the preset doneness level in the doneness model and the cooking parameters, then, the remaining cooking duration for reaching the target doneness level from the current doneness level is calculated, the remaining cooking duration is compared with the remaining working duration, if the remaining cooking duration is inconsistent with the remaining working duration, it is proven that the situation that the cooking material is burned or does not reach the target doneness level is easily caused in this cooking, at the moment, the cooking parameters of the cooking material are adjusted to enable the remaining cooking duration to be equal to the remaining working duration, and therefore, it is ensured that the cooking material reaches the target doneness level after the cooking equipment works according to the cooking parameters, the automatic and dynamic adjustment of the cooking process is achieved, and the user experience is improved.

Embodiment 7

Figure 7:
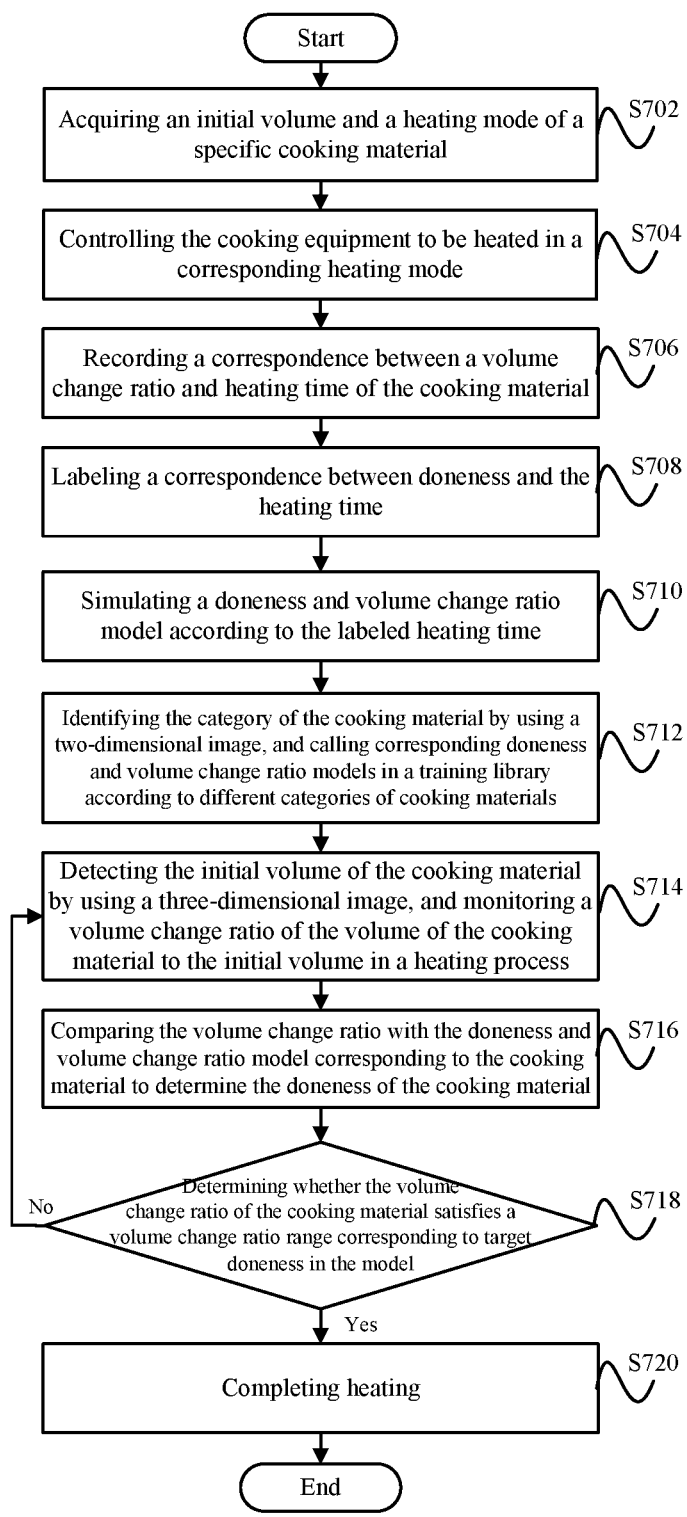
FIG. 7 shows a schematic process diagram of a control method for a cooking equipment according to a specific embodiment of the present disclosure.

As shown in FIG. 7, according to a specific embodiment of the present disclosure, a baking oven is used as a cooking equipment, and a control method for the cooking equipment includes:

step S702, an initial volume and a heating mode of a specific cooking material are acquired;

step S704, the cooking equipment is controlled to be heated in a corresponding heating mode;

step S706, a correspondence between a volume change ratio and heating time of the cooking material is recorded;

step S708, a correspondence between doneness and the heating time is labeled;

step S710, a doneness and volume change ratio model is simulated according to the labeled heating time;

step S712, the category of the cooking material is identified by using a two-dimensional image, and corresponding doneness and volume change ratio models in a training library are called according to different categories of cooking materials;

step S714, the initial volume of the cooking material is detected by using a three-dimensional image, and a volume change ratio of the volume of the cooking material to the initial volume is monitored in a heating process;

step S716, the volume change ratio is compared with the doneness and volume change ratio model corresponding to the cooking material to determine the doneness of the cooking material;

step S718, it is determined whether the volume change ratio of the cooking material satisfies a volume change ratio range corresponding to target doneness in the model, if yes, step S720 is performed, if not, the step S714 is performed; and step S720, heating is completed.

In this embodiment, a three-dimensional camera is mounted on the top or side of a baking oven to ensure that its view covers an ovenware region. Before use, the volume change ratio model of different food from uncooked to cooked may need to be pre-trained, and in the model, the doneness level of the food may be divided into a plurality of doneness levels from uncooked to overdone. Specifically, in the model, the doneness level of the cooking material is divided into seven doneness levels in total from uncooked to burned, including seven doneness points: uncooked, rare, medium, medium well, well done, overdone and burned, and the labeling of the doneness may need to be determined by users as a matter of experience or a certain determination standard. The volume V0 of uncooked food is gradually changed into V1, V2, V3, . . . Vn with the heating of the food, the volume change ratio of the volume within different heating time to the volume of the uncooked food is expressed as RV1=V1/V0, RV2=V2/V0, . . . RVn=Vn/0, a correspondence between the heating time and the volume change ratio RV of specific food under a specific heating mode is generated, meanwhile, the doneness corresponding to different time points may need to be manually labeled in the cooking process of the food, and thus, a correspondence between the cooking time and the doneness of the specific food under a specific cooking mode is generated. In combination with the two correspondences, a correspondence between the volume change ratio and the doneness of the specific food under the specific cooking mode, namely the doneness and volume change ratio model (doneness model), may be obtained, and thus, the doneness of the food may be determined according to the volume change ratio. Such a model is trained and disposed on a local system or a remote server. Different cooking materials and different heating modes correspond to different doneness and volume change ratio models.

After the model is completely trained, the cooking material is put into the baking oven. Firstly, the three-dimensional camera is utilized to generate two-dimensional RGB (color) image information; the category of the cooking material is identified by using an image recognition technology; the specific heating mode and heating time which have been trained in the model are selected according to the category of the cooking material, and the baking oven is controlled to work in the corresponding specific heating mode and heating time; in the heating process, the three-dimensional camera continuously acquires three-dimensional image information and calculates the volume or length, width and height information of the cooking material; in the heating process, the volume change ratio of the cooking material is monitored in real time and is compared with the doneness in a model library, and thus, the doneness level of the cooking material is determined; and by training a relation between the doneness and the heating time in the model, the time for reaching target doneness from the current doneness is estimated, and the countdown is displayed; and in the heating process, the three-dimensional camera may perform continuous acquisition, and doneness information and time information of the baking oven are continuously updated. When the doneness of the current cooking material reaches the target doneness, the baking oven is controlled to stop heating, and heating ending is prompted by voice/images, so that the system may be not watched by a user, or doneness determination is provided for a user having no cooking experience, and then, automatic doneness recognition and automatic cooking functions are achieved.

Embodiment 8

Figure 8:
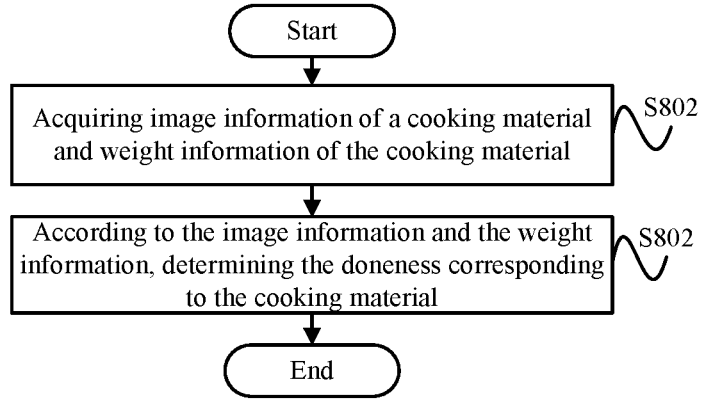
FIG. 8 shows a schematic process diagram of a control method for a cooking equipment according to another embodiment of the present disclosure.

As shown in FIG. 8, according to an embodiment in a second aspect of the present disclosure, a control method for a cooking equipment is provided. The method includes:
    step S802, image information of a cooking material and weight information of the cooking material are acquired; and
    step S804, according to the image information and the weight information, the doneness corresponding to the cooking material is determined.

In this embodiment, the volume of the cooking material may be increased or reduced in a cooking process, and the weight may also be changed due to the evaporation of water, so that the doneness change of the cooking material from inside to outside may be integrated to density information. Size information and category information of the cooking material are obtained by identifying the image information, then, volume information of the cooking material is obtained according to the size information, density information of the cooking material is calculated according to the volume information and the weight information of the cooking material, and according to the density of the cooking material, the doneness corresponding to the cooking material is determined in a pre-trained doneness model; thus, on one hand, the volume and weight change, namely the density change, of the cooking material can be monitored in real time, on the other hand, an automatic doneness recognition function is achieved by using the density, the observation time of a user is greatly saved, the recognition difficulty is effectively lowered, inaccuracy caused by purely determining the doneness of a food by means of a color and a surface temperature in a conventional method is avoided, and a reliable basis is provided for subsequently controlling the cooking equipment to work.

Specifically, an image recognition algorithm may be a local recognition algorithm, a cloud recognition algorithm, a deep learning manner or a mode recognition manner.

Embodiment 9

Figure 9:
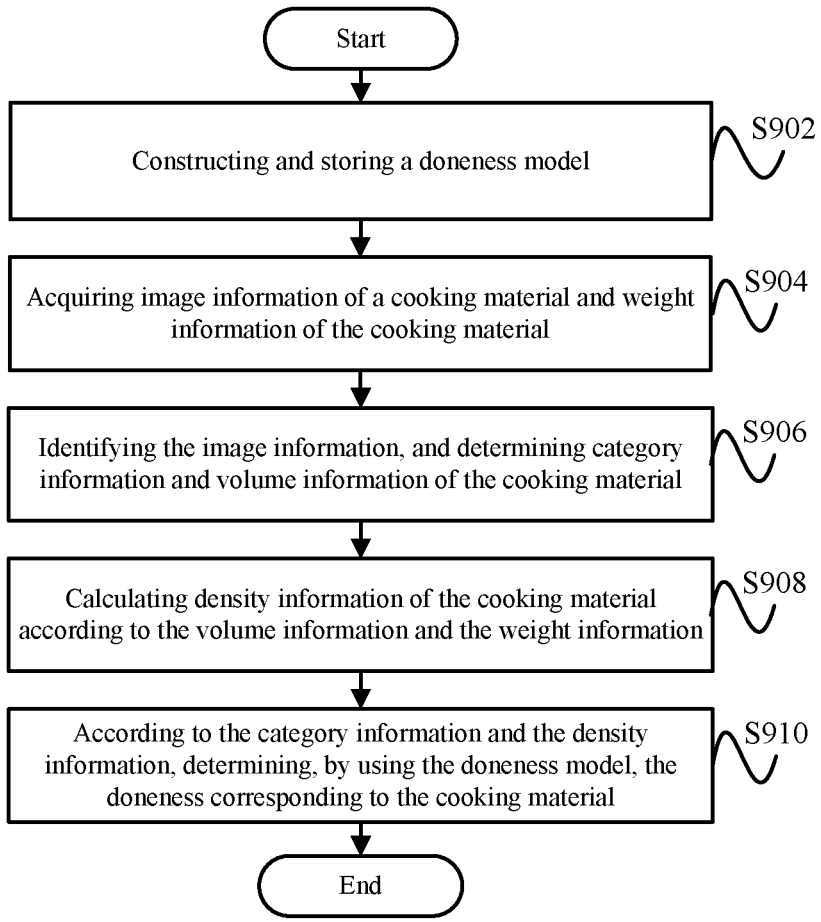
FIG. 9 shows a schematic process diagram of a control method for a cooking equipment according to another embodiment of the present disclosure.

As shown in FIG. 9, according to an embodiment of the present disclosure, a control method for a cooking equipment is provided. The method includes:
    step S902, a doneness model is constructed and stored;
    step S904, image information of a cooking material and weight information of the cooking material are acquired;
    step S906, the image information is identified, and category information and volume information of the cooking material are determined;
    step S908, density information of the cooking material is calculated according to the volume information and the weight information; and
    step S910, according to the category information and the density information, the doneness corresponding to the cooking material is determined by using the doneness model.

In this embodiment, since the cooking material is half-cooked or fermented, the volume of the cooking material has been changed to a certain extent, if the doneness of the cooking material is only determined according to the volume change, certain errors may be caused. The density of the cooking material is a cumulant and may comprehensively reflect the doneness of the cooking material from inside to outside, and therefore, the category information and the volume information of the cooking material are determined by using the image information, the density information of the corresponding cooking material is obtained according to a formula: density ($\rho$)=weight (m)/volume (V), the density of the cooking material is compared with data in the doneness model according to the category information of the cooking material, and thus, the doneness of the cooking material is obtained. Therefore, recognition achieved by manual observation is not needed, a doneness determination function is provided for a user having no cooking experience, the accuracy for doneness recognition is effectively improved, and a reliable basis is provided for subsequently controlling the cooking equipment to work.

Further, the step that the image information is identified, and the volume information of the cooking material is determined specifically includes: the image information is identified, and three-dimensional information of the cooking material is determined; size information of the cooking material is determined according to the three-dimensional information; and the volume information is determined according to the size information.

Specifically, the three-dimensional information is a three-dimensional cloud point including coordinate information and color information and/or laser reflection intensity, and then, the size of the cooking material is calculated according to the coordinate information. The image information includes a two-dimensional color image and a three-dimensional image. The category information of the cooking material is identified by using the two-dimensional image, the size information is identified by using the three-dimensional image, and further, an image is enhanced after being acquired, so that the resolution of the image is improved, which is beneficial to the accurate identification of the category information and the size information.

Embodiment 10

Figure 10:
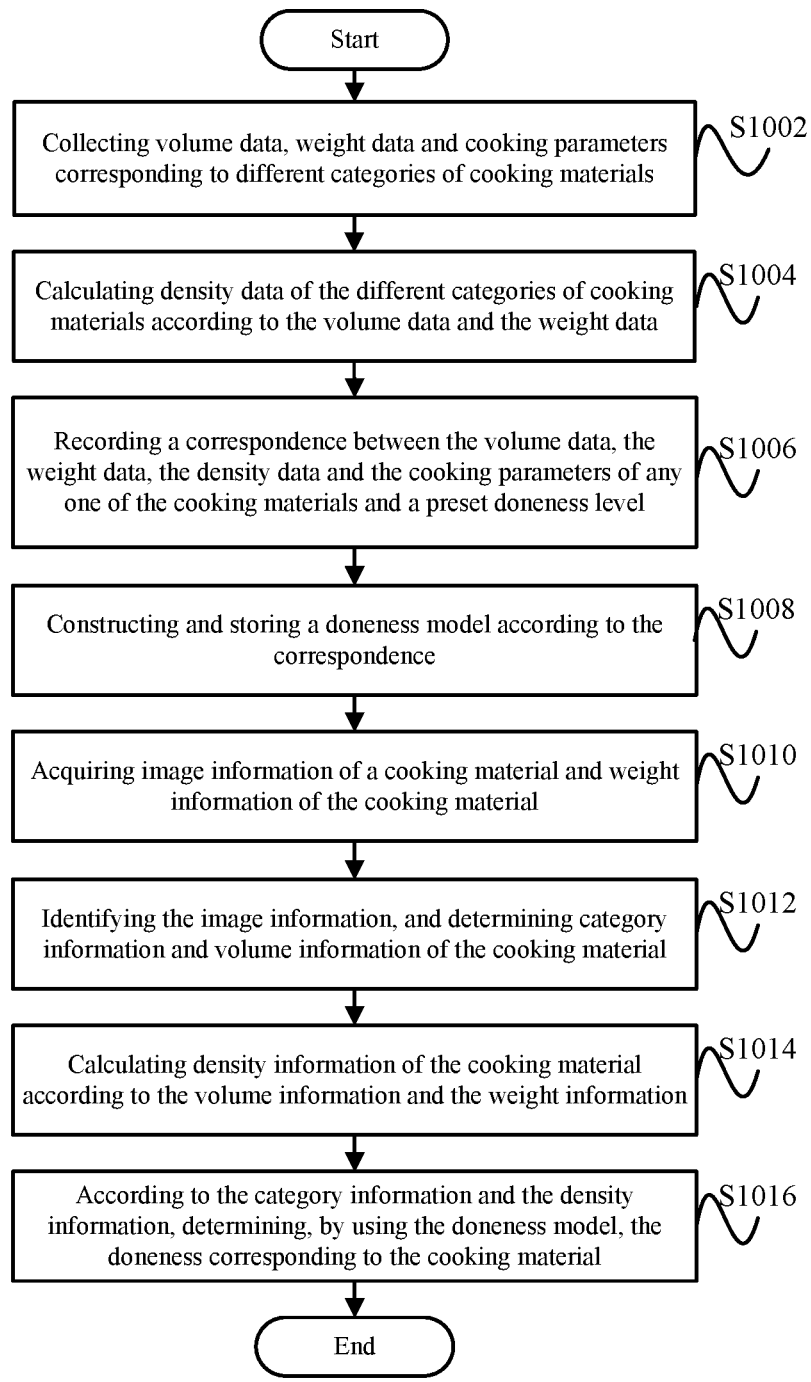
FIG. 10 shows a schematic process diagram of a control method for a cooking equipment according to another embodiment of the present disclosure.

As shown in FIG. 10, according to an embodiment of the present disclosure, a control method for a cooking equipment is provided. The method includes:
- step S1002, volume data, weight data and cooking parameters corresponding to different categories of cooking materials are collected;
- step S1004, density data of the different categories of cooking materials is calculated according to the volume data and the weight data;
- step S1006, a correspondence between the volume data, the weight data, the density data and the cooking parameters of any one of the cooking materials and a preset doneness level is recorded;
- step S1008, a doneness model is constructed and stored according to the correspondence;
- step S1010, image information of a cooking material and weight information of the cooking material are acquired;
- step S1012, the image information is identified, and category information and volume information of the cooking material are determined;
- step S1014, density information of the cooking material is calculated according to the volume information and the weight information; and
- step S1016, according to the category information and the density information, the doneness corresponding to the cooking material is determined by using the doneness model.

In this embodiment, the volume data, the weight data and the cooking parameters corresponding to the different categories of cooking materials are collected, wherein the cooking parameters include a mode, power and duration. The density data of the different categories of cooking materials is calculated according to the volume data and the weight data; under different cooking modes and power, the volume data, the weight data and the density data of an undercooked cooking material in the different categories of cooking materials are gradually changed with the increment of cooking duration; the correspondence between the volume data, the weight data, the density data and the cooking parameters of any one of the cooking materials and the preset doneness level is recorded, for example, a sweet potato which is cooked under the power of 1000 W for 10 min in a baking mode has the density being 1.1 to 1.2 g/cm$^3$ and the doneness level being rare, and a sweet potato which is cooked for 60 min has the density being 0.95 to 1.0 g/cm$^3$ and the doneness level being well done; and the doneness model is constructed according to the foregoing correspondence and is stored in a system, so that the doneness of the cooking material at different cooking stages is determined according to the category information and the density information when the cooking material is cooked.

Specifically, in the model, the preset doneness level of the cooking material is divided into a plurality of doneness levels from uncooked to burned, such as seven doneness levels including uncooked, rare, medium, medium well, well done, overdone and burned, and the doneness level may need to be reasonably set by a user as a matter of experience or a certain determination standard.

Embodiment 11

Figure 11:
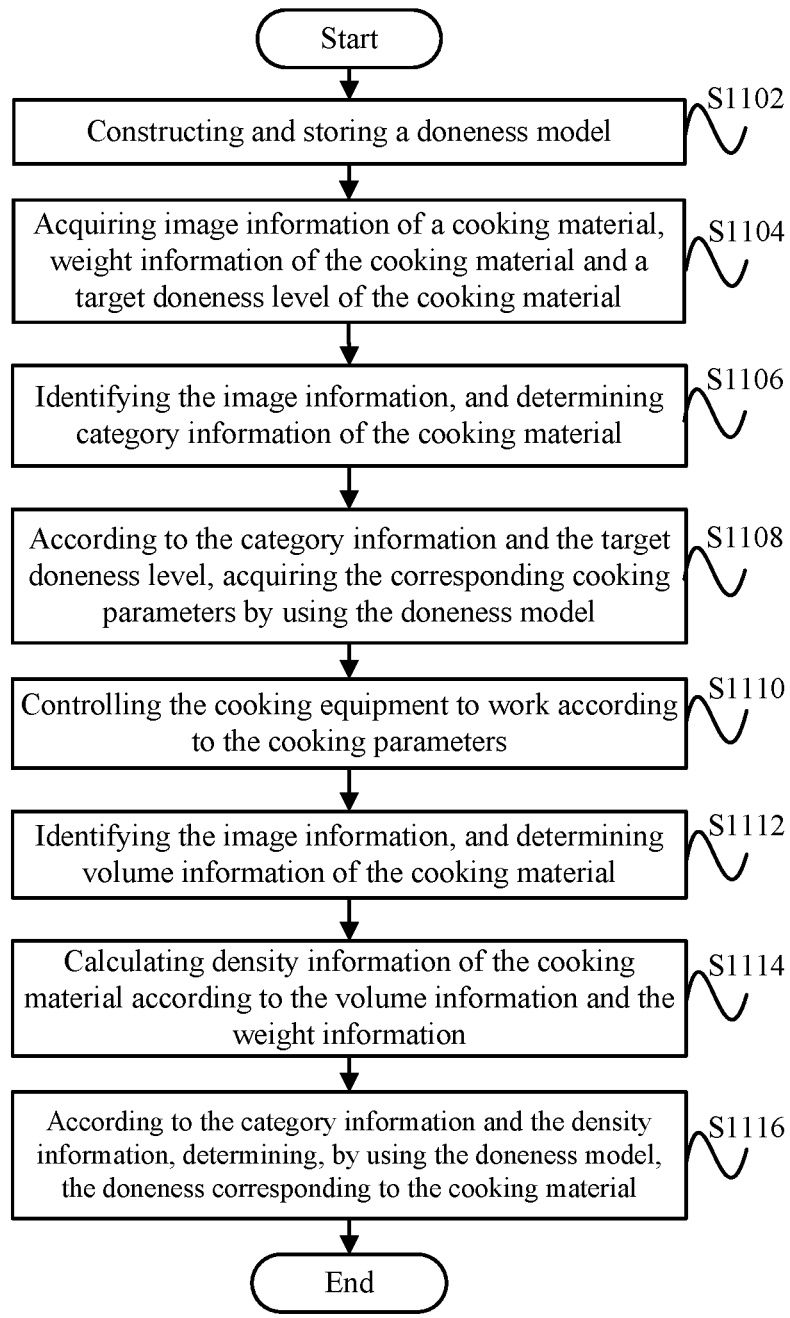
FIG. 11 shows a schematic process diagram of a control method for a cooking equipment according to another embodiment of the present disclosure.

As shown in FIG. 11, according to an embodiment of the present disclosure, a control method for a cooking equipment is provided. The method includes:
- step S1102, a doneness model is constructed and stored;
- step S1104, image information of a cooking material, weight information of the cooking material and a target doneness level of the cooking material are acquired;
- step S1106, the image information is identified, and category information of the cooking material is determined;
- step S1108, according to the category information and the target doneness level, the corresponding cooking parameters are acquired by using the doneness model;
- step S1110, the cooking equipment is controlled to work according to the cooking parameters;
- step S1112, the image information is identified, and volume information of the cooking material is determined;
- step S1114, density information of the cooking material is calculated according to the volume information and the weight information; and
- step S1116, according to the category information and the density information, the doneness corresponding to the cooking material is determined by using the doneness model.

In this embodiment, the target doneness level of the cooking material, namely the doneness of the cooking material desired by a user, is acquired, the cooking parameters which have been stored in the doneness model are selected according to the category information and the target doneness level, the cooking equipment is controlled to work according to the cooking parameters, and thus, automatic cooking of the cooking material is achieved, the cooking material directly reaches the target doneness level after being cooked, and overcooking or undercooking is avoided; moreover, the overall cooking process does not need to be watched by the user, and a reliable cooking solution which is simple, accurate and easy to operate can be provided for the user having no cooking experience.

It should be noted that when one cooking material in the doneness model is pre-trained with various cooking parameters, all the cooking parameters are pushed to the user, and the cooking equipment is controlled to work according to the parameter determined by the user. For example, the user wants to heat fish to be well done, there is a first parameter: baking, 2000 W, 10 min and a second parameter: steaming, 1000 W, 20 min in the model, at the moment, the user may select the first or second parameter as desired.

In addition, at the only moment after the image information of the cooking material is acquired for the first time, according to the category information and the target doneness level, the corresponding cooking parameters are acquired by using the doneness model, and the cooking equipment is controlled to work. If the cooking equipment is in a working state, the step that the cooking parameters are acquired is automatically skipped, the image information of the cooking material is acquired in real time, and the density information of the cooking material is monitored according to the image information and the weight information until the cooling is ended.

Embodiment 12

Figure 12:
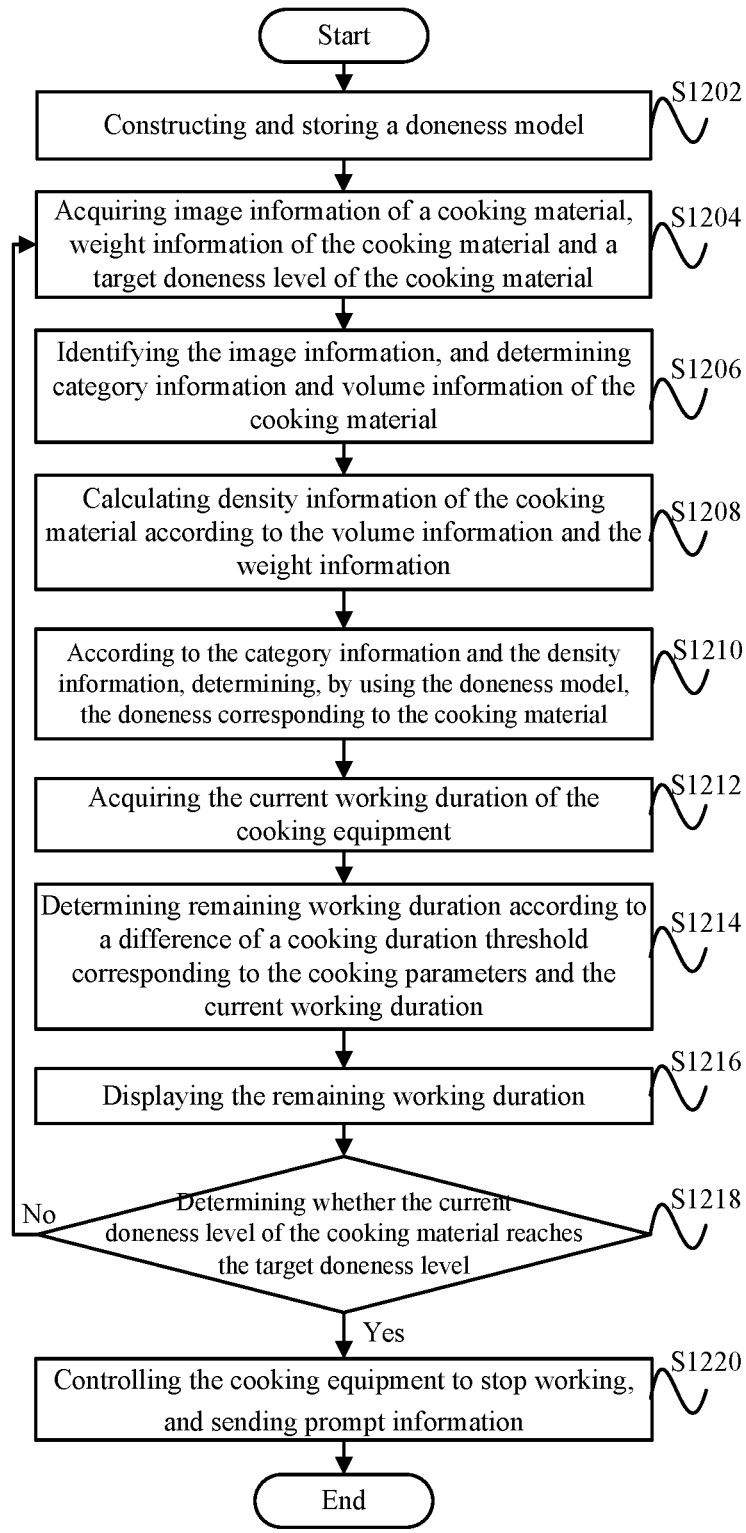
FIG. 12 shows a schematic process diagram of a control method for a cooking equipment according to another embodiment of the present disclosure.

As shown in FIG. 12, according to an embodiment of the present disclosure, a control method for a cooking equipment is provided. The method includes:
step S1202, a doneness model is constructed and stored;
step S1204, image information of a cooking material, weight information of the cooking material and a target doneness level of the cooking material are acquired;
step S1206, the image information is identified, and category information and volume information of the cooking material are determined;
step S1208, density information of the cooking material is calculated according to the volume information and the weight information;
step S1210, according to the category information and the density information, the doneness corresponding to the cooking material is determined by using the doneness model;
step S1212, the current working duration of the cooking equipment is acquired;
step S1214, remaining working duration is determined according to a difference of a cooking duration threshold corresponding to the cooking parameters and the current working duration;
step S1216, the remaining working duration is displayed;
step S1218, it is determined whether the current doneness level of the cooking material reaches the target doneness level, if yes, step S1220 is performed, if not, the step S1204 is performed; and
step S1220, the cooking equipment is controlled to stop working, and prompt information is sent.

In this embodiment, the current working duration of the cooking equipment, namely the duration that the cooking equipment works according to the cooking parameters, is acquired, the remaining cooking duration for reaching the target doneness level from the current doneness level of the cooking material is determined according to the difference of the cooking duration threshold corresponding to the cooking parameters and the current working duration, and the remaining working duration is displayed to prompt a user to count down the cooking time, it is convenient for the user to intuitively know about the cooking time, which is beneficial to cooking planning, thereby increasing the cooking efficiency. Moreover, when the density information satisfies the density range corresponding to the target doneness level, it is proven that the cooking material is completely cooked, at the moment, the cooking equipment is controlled to stop working, and the prompt information is sent to prompt the user to end the cooking. By adopting the foregoing solution, the doneness level of the cooking material is affirmed without adopting the original manual manner, and the cooking material is automatically cooked according to the set cooking parameters, so that the observation time of the user is saved, great convenience is brought for the user, and the use experience of the user is greatly enhanced.

Embodiment 13

Figure 13:
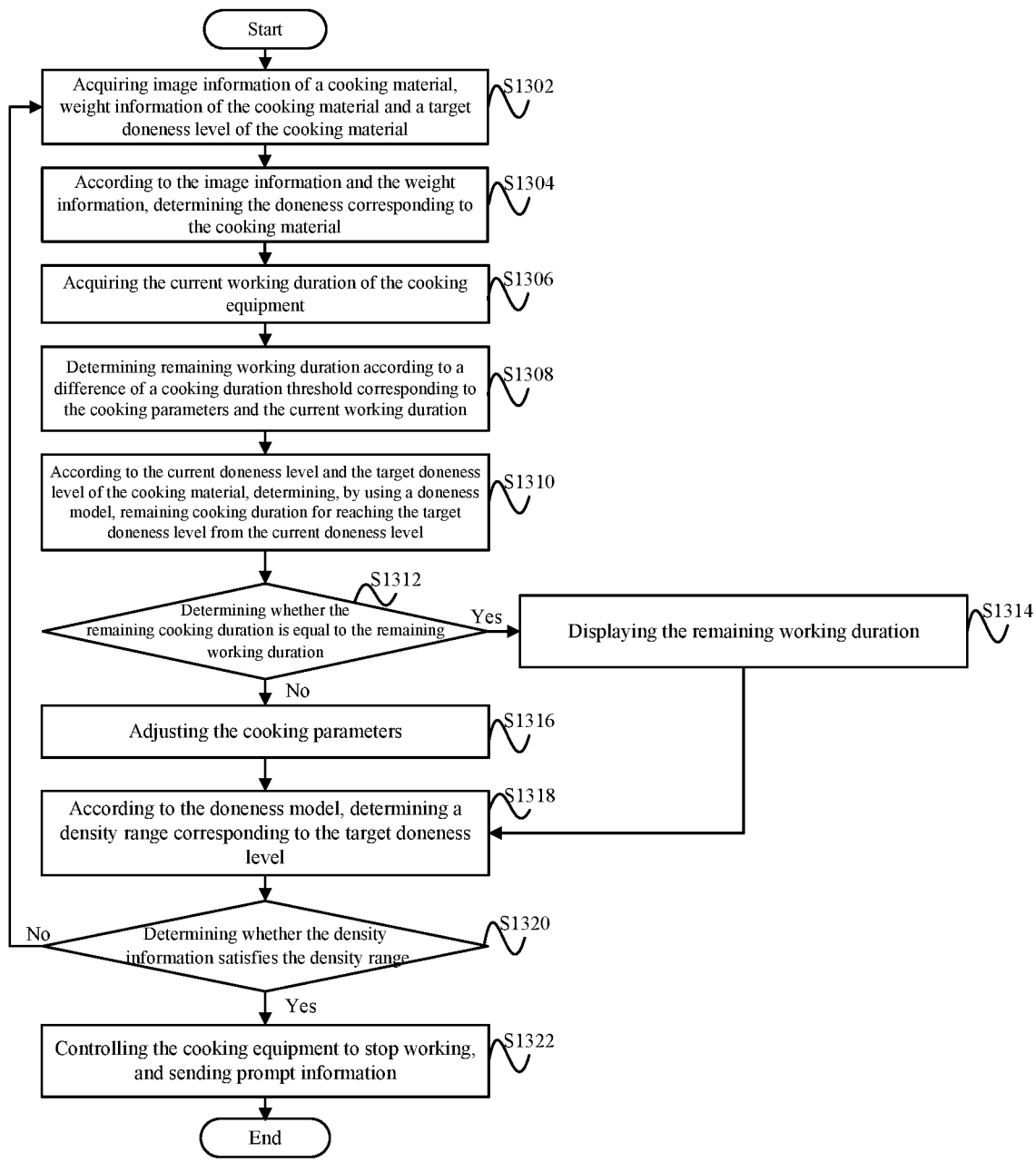
FIG. 13 shows a schematic process diagram of a control method for a cooking equipment according to another embodiment of the present disclosure.

As shown in FIG. 13, according to an embodiment of the present disclosure, a control method for a cooking equipment is provided. The method includes:
step S1302, image information of a cooking material, weight information of the cooking material and a target doneness level of the cooking material are acquired;
step S1304, according to the image information and the weight information, the doneness corresponding to the cooking material is determined;
step S1306, the current working duration of the cooking equipment is acquired;
step S1308, remaining working duration is determined according to a difference of a cooking duration threshold corresponding to the cooking parameters and the current working duration;
step S1310, according to the current doneness level and the target doneness level of the cooking material, remaining cooking duration for reaching the target doneness level from the current doneness level is determined by using a doneness model;
step S1312, it is determined whether the remaining cooking duration is equal to the remaining working duration, if yes, step S1314 is performed, if not, step S1316 is performed;
step S1314, the remaining working duration is displayed, and step S1318 is performed;
step S1316, the cooking parameters are adjusted;
step S1318, according to the doneness model, a density range corresponding to the target doneness level is determined;
step S1320, it is determined whether the density information satisfies the density range, if yes, step S1322 is performed, if not, the step S1302 is performed; and
step S1322, the cooking equipment is controlled to stop working, and prompt information is sent.

In this embodiment, due to certain doneness of the cooking material itself or other factors, there is a bias between the set cooking duration threshold and the actual cooking duration for cooking the cooking material, by which cooking is ended, but the cooking material is burned or does not reach the target doneness level. Therefore, according to the current doneness level and the target doneness level of the cooking material, the cooking duration respectively corresponding to the current doneness level and the target doneness level is determined by means of a relation between the preset doneness level in the doneness model and the cooking parameters, then, the remaining cooking duration for reaching the target doneness level from the current doneness level is calculated, the remaining cooking duration is compared with the remaining working duration, if the remaining cooking duration is inconsistent with the remaining working duration, it is proven that the situation that the cooking material is burned or does not reach the target doneness level is easily caused in this cooking, at the moment, the cooking parameters of the cooking material are adjusted to enable the remaining cooking duration to be equal to the remaining working duration, and therefore, it is ensured that the cooking material reaches the target doneness level after the cooking equipment works according to the cooking parameters, the automatic and dynamic adjustment of the cooking process is achieved, and the user experience is improved.

Embodiment 14

Figure 14:
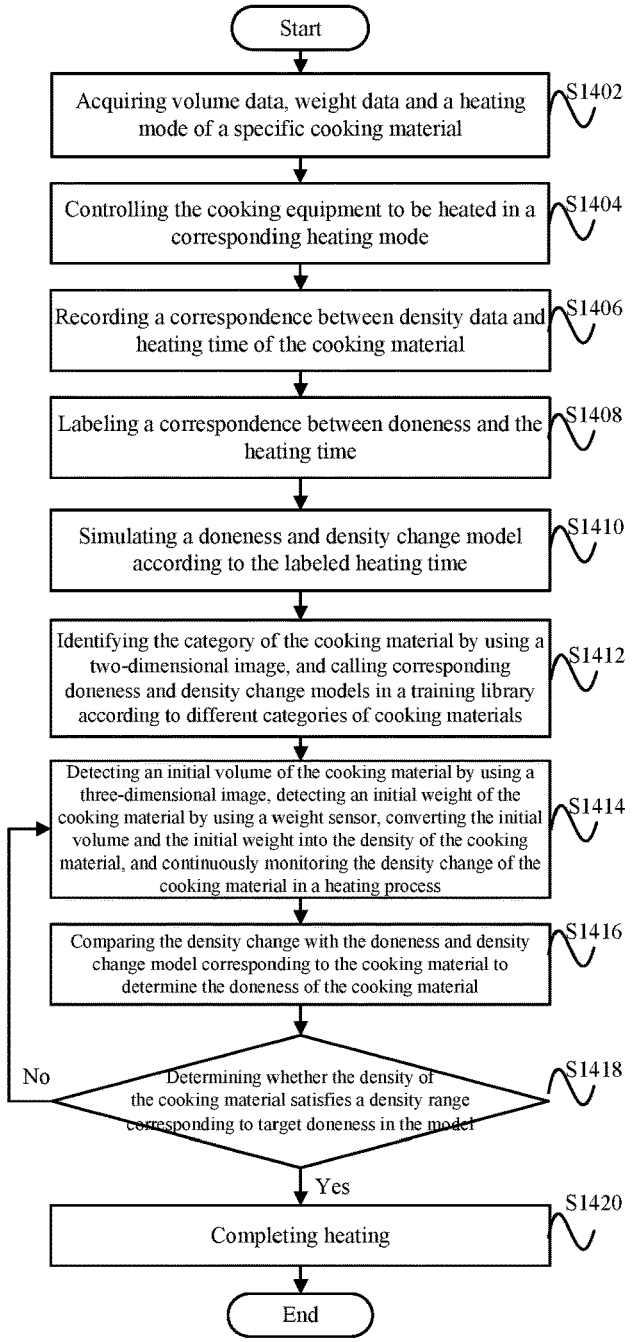
FIG. 14 shows a schematic process diagram of a control method for a cooking equipment according to another specific embodiment of the present disclosure.

As shown in FIG. 14, according to a specific embodiment of the present disclosure, a baking oven is used as a cooking equipment, and a control method for the cooking equipment includes:
step S1402, volume data, weight data and a heating mode of a specific cooking material are acquired;

step S1404, the cooking equipment is controlled to be heated in a corresponding heating mode;

step S1406, a correspondence between density data and heating time of the cooking material is recorded;

step S1408, a correspondence between doneness and the heating time is labeled;

step S1410, a doneness and density change model is simulated according to the labeled heating time;

step S1412, the category of the cooking material is identified by using a two-dimensional image, and corresponding doneness and density change models in a training library are called according to different categories of cooking materials;

step S1414, an initial volume of the cooking material is detected by using a three-dimensional image, an initial weight of the cooking material is detected by using a weight sensor, the initial volume and the initial weight are converted into the density of the cooking material, and the density change of the cooking material is continuously monitored in a heating process;

step S1416, the density change is compared with the doneness and density change model corresponding to the cooking material to determine the doneness of the cooking material;

step S1418, it is determined whether the density of the cooking material satisfies a density range corresponding to target doneness in the model, if yes, step S1420 is performed, if not, the step S1414 is performed; and step S1420, heating is completed.

In this embodiment, a three-dimensional camera is mounted on the top or side of a baking oven to ensure that its view covers an ovenware region. Before use, the density change models of different cooking materials from uncooked to cooked may need to be pre-trained, and in each model, the doneness level of the cooking material may be divided into a plurality of doneness levels from uncooked to overdone. Specifically, in the model, the doneness level of the cooking material is divided into seven doneness levels in total from uncooked to burned, including seven doneness points: uncooked, rare, medium, medium well, well done, overdone and burned, and the labeling of the doneness may need to be determined by people as a matter of experience or a certain determination standard. The density $\rho 0$ of an uncooked cooking material is also gradually changed to $\rho 1$, $\rho 2$, $\rho 3$, . . . $\rho n$ while the cooking material is cooked; a correspondence between the heating time and the density of a specific cooking material under a specific cooking mode is generated according to the density change of the heated cooking material, meanwhile, the doneness corresponding to different heating time points may need to be manually labeled in the cooking process of the cooking material, and thus, a correspondence between the heating time and the doneness of the specific cooking material under a specific heating mode is generated. In combination with the two correspondences, a correspondence between the doneness and the density of the specific cooking material under the specific heating mode, namely the doneness and density change model (doneness model), may be obtained. Such a model is trained and disposed on a local system or a remote server. Different cooking materials and different heating modes correspond to different doneness and density change models.

After the model is completely trained, the cooking material is put into the baking oven. Firstly, the three-dimensional camera is utilized to generate two-dimensional RGB (color) image information; the category of the cooking material is identified by using an image recognition technology; the specific heating mode and heating time which have been trained in the model are selected according to the category of the cooking material, and the baking oven is controlled to work in the corresponding specific heating mode and heating time; in the cooking process, the three-dimensional camera continuously acquires three-dimensional image information and calculates the volume or length, width and height information of the cooking material, the weight sensor continuously detects the weight information of the cooking material, and the density of the cooking material is obtained according to a formula: density $(\rho)$=weight (m)/volume (V); in the heating process, the density change of the cooking material is monitored in real time and is compared with the doneness in a model library, and thus, the doneness level of the cooking material is determined; and by training a relation between the doneness and the heating time in the model, the time for reaching target doneness from the current doneness is estimated, and the countdown is displayed; and in the heating process, the three-dimensional camera may perform continuous acquisition, and doneness information and time information of the baking oven are continuously updated. When the doneness of the current cooking material reaches the target doneness, the baking oven is controlled to stop heating, and heating ending is prompted by voice/images, so that the system may be not watched by a user, or doneness determination is provided for a user having no cooking experience, and then, automatic doneness recognition and automatic cooking functions are achieved.

Embodiment 15

Figure 15:
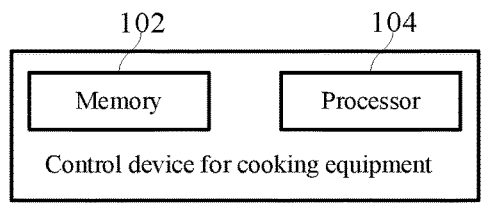
FIG. 15 shows a schematic block diagram of a control device for a cooking equipment according to an embodiment of the present disclosure.

As shown in FIG. 15, according to an embodiment in a third aspect of the present disclosure, a control device 100 for a cooking equipment is provided. The control device 100 includes a memory 102, a processor 104 and a computer program stored in the memory 102 and capable of running on the processor 104, wherein when the computer program is executed by the processor 104, the control method for the cooking equipment according to the embodiment in the first aspect is implemented. Therefore, the control device 100 for the cooking equipment has all the beneficial effects of the foregoing control method for the cooking equipment according to the embodiment in the first aspect.

Embodiment 16

Figure 16:
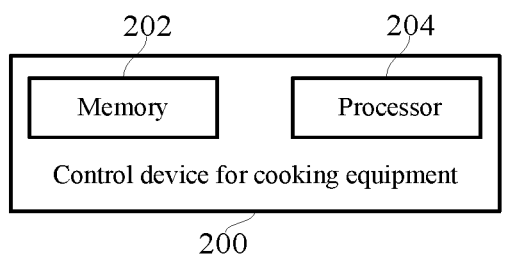
FIG. 16 shows a schematic block diagram of a control device for a cooking equipment according to an embodiment of the present disclosure.

As shown in FIG. 16, according to an embodiment in a fourth aspect of the present disclosure, a control device 200 for a cooking equipment is provided. The control device 200 includes a memory 202, a processor 204 and a computer program stored in the memory 202 and capable of running on the processor 204, wherein when the computer program is executed by the processor 204, the control method for the cooking equipment according to the embodiment in the second aspect is implemented. Therefore, the control device 200 for the cooking equipment has all the beneficial effects of the foregoing control method for the cooking equipment according to the embodiment in the second aspect.

Embodiment 17

According to an embodiment in a fifth aspect of the present disclosure, a cooking equipment is provided. The cooking equipment includes an image acquisition device and the control device for the cooking equipment according to the foregoing embodiment in the third aspect.

Specifically, the image acquisition device is used for acquiring image information of a cooking material; the control device is connected with the image acquisition device; the cooking equipment includes, but is not limited to at least one described as follows: a baking oven, a steaming oven, a microwave oven, etc.; and the image acquisition device is a three-dimensional image pickup device including one or more sets of cameras.

According to the cooking equipment provided in the present embodiment, the image information of the cooking material is acquired by the image acquisition device, size information and category information of the cooking material are obtained by identifying the image information, then, volume information of the cooking material is obtained according to the size information, the volume change amount of the cooking material in a cooking process is calculated by using the initial volume and the current volume of the cooking material, and according to the volume change amount of the cooking material, the doneness corresponding to the cooking material is determined in a pre-trained doneness model; thus, on one hand, the volume change of the cooking material can be monitored in real time, on the other hand, an automatic doneness recognition function is achieved by using the volume change amount, the observation time of a user is greatly saved, the recognition difficulty is effectively lowered, accuracy is higher compared with that in the solution that in the prior art, the food doneness is determined purely according to surface states such as colors, etc., and a reliable basis is provided for subsequently controlling the cooking equipment to work.

Further, the image information includes a two-dimensional color image and a three-dimensional image. The category information of the cooking material is identified by using the two-dimensional image, and the size information is identified by using the three-dimensional image. The image acquisition device includes one or more sets of cameras. By disposing a plurality of cameras, a multi-angle image of the cooking material can be achieved, which is beneficial to identification of the size information and the category information of the cooking material.

Embodiment 18

Figure 17:
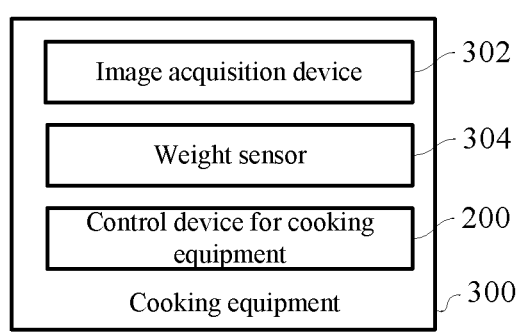
FIG. 17 shows a schematic block diagram of a cooking equipment according to an embodiment of the present disclosure.

As shown in FIG. 17, according to an embodiment in a sixth aspect of the present disclosure, a cooking equipment 300 is provided. The cooking equipment 300 includes an image acquisition device 302, a weight sensor 304, and the control device 200 for the cooking equipment according to the embodiment in the fourth aspect.

Specifically, the image acquisition device 302 is used for acquiring image information of a cooking material; the weight sensor 304 is used for acquiring weight information of the cooking material; the control device is connected with the image acquisition device 302 and the weight sensor 304; the cooking equipment 300 includes, but is not limited to at least one described as follows: a baking oven, a steaming oven, a microwave oven, etc.; and the image acquisition device 302 is a three-dimensional image pickup device including one or more sets of cameras.

According to the cooking equipment 300 provided in the present embodiment, the image information of the cooking material is acquired by the image acquisition device 302, the weight information of the cooking material is acquired by the weight sensor 304, size information and category information of the cooking material in the image information are identified, then, the volume of the cooking material is obtained according to the size information, density information of the cooking material is calculated according to the volume information and the weight information of the cooking material, and according to the density of the cooking material, the doneness corresponding to the cooking material is determined in a pre-trained doneness model; thus, on one hand, the volume and weight change, namely the density change, of the cooking material can be monitored in real time, on the other hand, an automatic doneness recognition function is achieved by using the density, the observation time of a user is greatly saved, the recognition difficulty is effectively lowered, inaccuracy caused by purely determining the doneness of a food by means of a color and a surface temperature in a conventional method is avoided, and a reliable basis is provided for subsequently controlling the cooking equipment to work.

Further, the image information includes a two-dimensional color image and a three-dimensional image. The category information of the cooking material is identified by using the two-dimensional image, and the size information is identified by using the three-dimensional image. In addition, a plurality of cameras are disposed, so that a multi-angle image of the cooking material can be achieved, which is beneficial to identification of the size information and the category information of the cooking material.

Embodiment 19

According to a seventh aspect of the present disclosure, provided is a computer readable storage medium storing a computer program thereon, wherein when the computer program is executed by a processor, the steps of the control method for the cooking equipment according to the embodiment in the first aspect or the steps of the control method for the cooking equipment according to the embodiment in the second aspect are implemented.

According to the computer readable storage medium provided in the present disclosure, when the computer program is executed by a processor, the steps of the control method for the cooking equipment according to the embodiment in the first aspect or the steps of the control method for the cooking equipment according to the embodiment in the second aspect are implemented. Therefore, the computer readable storage medium has all the beneficial effects of the control method for the cooking equipment according to the embodiment in the first aspect or the control method for the cooking equipment according to the embodiment in the second aspect.

In the illustration of the present description, terms such as "first" and "second" are merely for descriptive purposes, but cannot be understood as indicating or implying the relative importance unless otherwise clearly specified and limited. The terms "connected", "mounted", "fixed", etc. should be understood in a broad sense. For example, "connection" can be a fixed connection or detachable connection or integral connection; it can be a direct connection or indirect connection through an intermediate medium. The specific meaning of the above terms in the present disclosure will be understood by those of ordinary skill in the art, as the case may be.

In the illustration of the present description, the description of the terms "one embodiment", "some embodiments", "specific embodiments", etc. means that the specific features, structures, materials or characteristics described in conjunction with the embodiments or examples are included in at least one embodiment or example in the present disclosure. In the present description, schematic representations of the above terms do not necessarily refer to the same embodiment or example. Furthermore, the described specific features, structures, materials, or characteristics may be combined in any suitable manner in any one or more embodiments or examples.

The foregoing is only a preferred embodiment of the present disclosure and is not intended to limit the present disclosure, as various modifications and changes therein will occur to those skilled in the art. Any modifications, equivalents, improvements, etc. that come within the spirit and principles of the present disclosure are intended to be included within the protection scope of the present disclosure.

What is claimed is:

1. A control method, comprising:
    acquiring image information of a cooking material;
    identifying the image information, and determining category information and volume information of the cooking material;
    determining a doneness corresponding to the cooking material according to the category information and the volume information,
    before determining the doneness corresponding to the cooking material according to the category information and the volume information:
        acquiring a target doneness level of the cooking material;
        according to the category information and the target doneness level, acquiring corresponding cooking parameters using a doneness model; and
        controlling a cooking equipment to work according to the cooking parameters;
    acquiring a current working duration of the cooking equipment;
    determining a remaining working duration according to a difference of a cooking duration threshold corresponding to the cooking parameters and the current working duration; and
    displaying the remaining working duration.

2. The control method according to claim 1, wherein determining the doneness corresponding to the cooking material according to the category information and the volume information comprises:
    calculating a volume change amount of the cooking material based on the volume information; and
    determining, by using the doneness model, the doneness corresponding to the cooking material based on the category information and the volume change amount.

3. The control method according to claim 2, wherein identifying the image information, and determining the volume information of the cooking material comprises:
    identifying the image information, and determining three-dimensional information of the cooking material;
    determining size information of the cooking material based on the three-dimensional information; and
    determining the volume information based on the size information.

4. The control method according to claim 2, further comprising:
    before acquiring the image information of the cooking material:
        constructing and storing the doneness model.

5. The control method according to claim 4, wherein constructing and storing the doneness model comprises:
    collecting volume data and cooking parameters corresponding to different categories of cooking materials;
    determining volume change amount data of the different categories of cooking materials according to the volume data;
    recording a correspondence between each of the volume change amount data and the cooking parameters of any one of the cooking materials and a preset doneness level; and
    constructing and storing the doneness model according to the correspondence between each of the volume change amount data and the cooking parameters of any one of the cooking materials.

6. The control method according to claim 1, further comprising:
    before displaying the remaining working duration:
        determining, by using the doneness model, a remaining cooking duration for reaching the target doneness level from a current doneness level based on the current doneness level and the target doneness level of the cooking material;
        comparing the remaining cooking duration with the remaining working duration; and
        adjusting the cooking parameters based on whether the remaining cooking duration is greater or smaller than the remaining working duration.

7. The control method according to claim 1, further comprising:
    in accordance with a determination that a current doneness level of the cooking material reaches the target doneness level, controlling the cooking equipment to stop working, and sending prompt information; or
    determining a volume change amount range corresponding to the target doneness level based on the doneness model; and
    in accordance with a determination that the volume change amount satisfies the volume change amount range, controlling the cooking equipment to stop working, and sending a prompt information.

8. The control method according to claim 1, wherein the image information comprises a two-dimensional color image and a three-dimensional image, the category information of the cooking material is identified using the two-dimensional image, size information is identified by using the three-dimensional image, and the method further comprising enhancing an image increase a resolution of the image for identification of the category information and the size information.

9. The control method according to claim 1, wherein: in accordance with a determination that the remaining cooking duration is inconsistent with the remaining working duration, adjusting the cooking parameters of the cooking material to enable the remaining cooking duration to be equal to the remaining working duration.

* * * * *